United States Patent
Sugiura et al.

(10) Patent No.: US 8,112,772 B2
(45) Date of Patent: Feb. 7, 2012

(54) ELECTRONIC APPARATUS

(75) Inventors: Yuzuru Sugiura, Kobe (JP); Yasuhiro Yuda, Kobe (JP); Yukio Shimizu, Kobe (JP); Masatoshi Ohtani, Kobe (JP); Yuya Tanaka, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 960 days.

(21) Appl. No.: 11/921,306

(22) PCT Filed: Jun. 2, 2006

(86) PCT No.: PCT/JP2006/311131
§ 371 (c)(1),
(2), (4) Date: Mar. 19, 2008

(87) PCT Pub. No.: WO2006/129808
PCT Pub. Date: Dec. 7, 2006

(65) Prior Publication Data
US 2008/0235716 A1    Sep. 25, 2008

(30) Foreign Application Priority Data

Jun. 2, 2005 (JP) .................... 2005-162799
Sep. 20, 2005 (JP) .................... 2005-272952

(51) Int. Cl.
*G11B 17/03* (2006.01)
(52) U.S. Cl. ........................................ 720/601
(58) Field of Classification Search ............ 720/624, 720/601, 607, 608, 613, 614, 615, 622, 632, 720/633
See application file for complete search history.

(56) References Cited

U.S. PATENT DOCUMENTS

| 5,941,615 A | 8/1999 | Ito et al. |
| 2003/0174834 A1* | 9/2003 | Kida .................. 379/428.01 |
| 2005/0144819 A1 | 7/2005 | Shimizu et al. |

FOREIGN PATENT DOCUMENTS

| GB | 2 405 518 A | 3/2005 |
| JP | A-01-302797 | 12/1989 |
| JP | U-01-174787 | 12/1989 |
| JP | U-03-116071 | 12/1991 |
| JP | U-05-037555 | 5/1993 |

(Continued)

OTHER PUBLICATIONS

Oct. 23, 2009 Office Action issued in Chinese Patent Application No. 200680028236X (with translation).

(Continued)

*Primary Examiner* — Allen Cao
(74) *Attorney, Agent, or Firm* — Oliff & Berridge, PLC

(57) ABSTRACT

The present invention is an electronic apparatus including: an electronic apparatus main body 1; a panel main body that has a first guided component guided by a first guide groove C1 formed in the electronic apparatus main body, and moves in an inclined state with respect to the electronic apparatus main body; and a hold plate 6 that has a second guided portion guided by a second guide groove C2 formed in the electronic apparatus main body, and slidably holds the panel main body. According to the present invention, a mechanism for tilting the panel main body and a mechanism for sliding the panel main body are provided separately from each other, so that the panel main body having an increased weight can be operated smoothly in the inclined state.

13 Claims, 25 Drawing Sheets

FOREIGN PATENT DOCUMENTS

| | | |
|---|---|---|
| JP | A-05-275482 | 10/1993 |
| JP | A-06-156153 | 6/1994 |
| JP | A-6-336142 | 12/1994 |
| JP | U-07-010982 | 2/1995 |
| JP | U-07-015447 | 3/1995 |
| JP | A-07-215137 | 8/1995 |
| JP | A-07-266942 | 10/1995 |
| JP | A-07-285390 | 10/1995 |
| JP | A-07-291045 | 11/1995 |
| JP | A-08-175278 | 7/1996 |
| JP | A-08-175279 | 7/1996 |
| JP | A-08-282391 | 10/1996 |
| JP | A-08-301020 | 11/1996 |
| JP | A-09-205285 | 8/1997 |
| JP | A-10-051712 | 2/1998 |
| JP | A-10-119662 | 5/1998 |
| JP | A-10-123461 | 5/1998 |
| JP | A-10-135669 | 5/1998 |
| JP | A-10-255452 | 9/1998 |
| JP | A-11-022725 | 1/1999 |
| JP | A-11-084131 | 3/1999 |
| JP | A-2000-095034 | 4/2000 |
| JP | A-2000-299827 | 10/2000 |
| JP | A-2001-063402 | 3/2001 |
| JP | A-2001-114028 | 4/2001 |
| JP | A-2001-134199 | 5/2001 |
| JP | A-2002-238211 | 8/2002 |
| JP | A-2003-054322 | 2/2003 |
| JP | A-2003-226186 | 8/2003 |
| JP | A-2003-243842 | 8/2003 |
| JP | A-2003-257166 | 9/2003 |
| JP | A-2004-101832 | 4/2004 |
| JP | A-2004-103684 | 4/2004 |
| JP | A-2004-127466 | 4/2004 |
| JP | A-2004-149057 | 5/2004 |
| JP | A-2005-047483 | 2/2005 |
| JP | A-2005-067240 | 3/2005 |
| JP | A-2005-078080 | 3/2005 |

OTHER PUBLICATIONS

Japanese Office Action issued in Japanese Patent Application No. 2005-272952 dated Nov. 2, 2010 (with translation).

* cited by examiner

FIG. 3
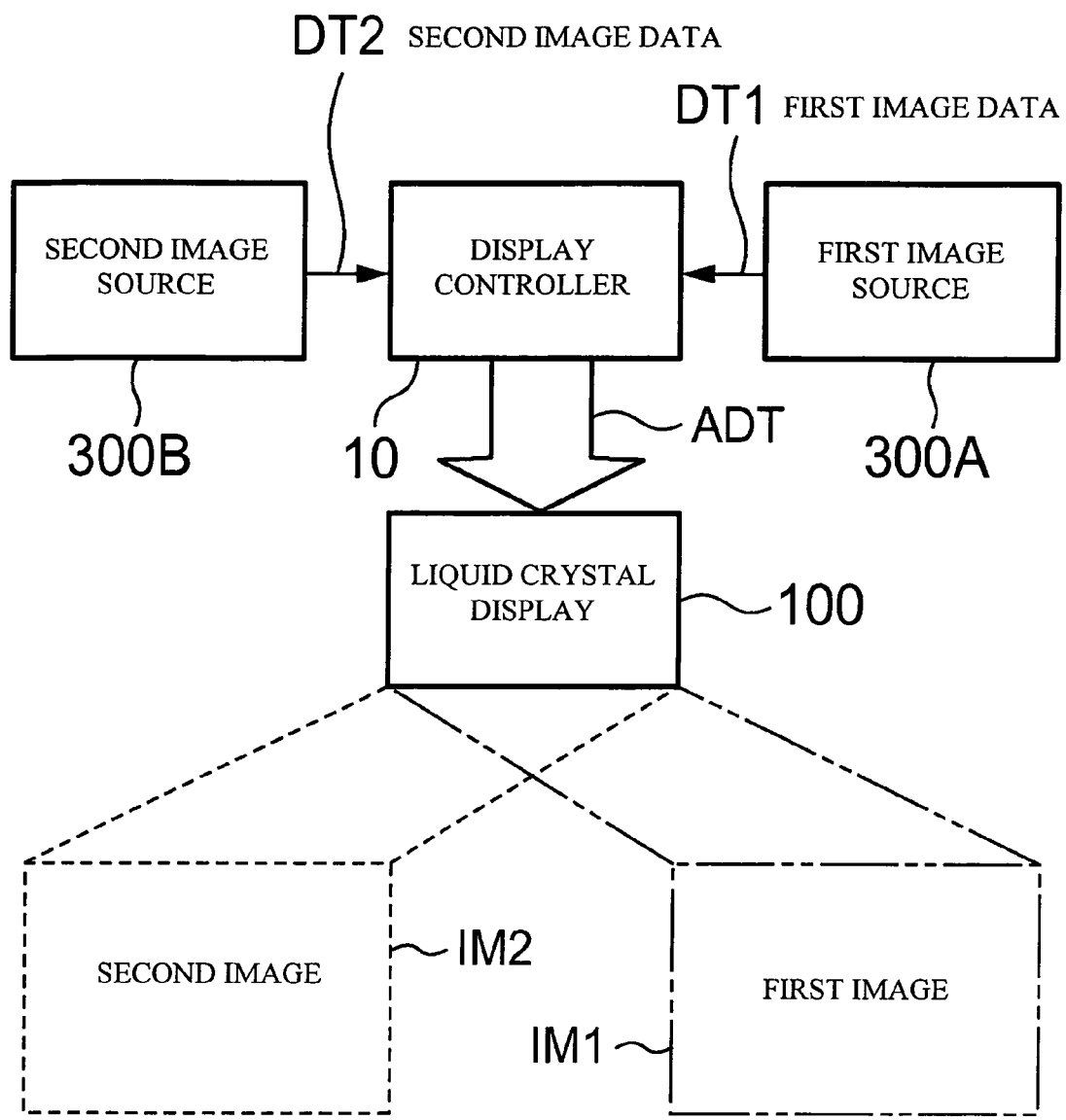
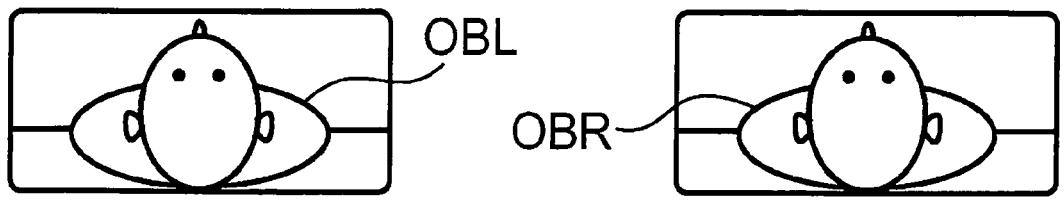

ELECTRONIC APPARATUS

TECHNICAL FIELD

The present invention relates to an electronic apparatus having a panel inclinable device realizing inclinable panel operation, and more particularly, to an electronic apparatus equipped with a panel inclinable device making it possible to smoothly and freely move a display panel in an inclined state on a navigation apparatus mounted on a vehicle.

BACKGROUND ART

Recently, display panels on which images can be displayed using a liquid crystal display (LCD) have been used for electronic apparatuses such as various information processing apparatuses using, as information sources, recording media such as television sets, personal computers (PC), compact disks and digital versatile disks (DVD). A navigation apparatus, which may be one of electronic apparatuses mounted on a vehicle, is equipped with an LCD display panel for displaying map information.

A conventional example of an in-vehicle navigation apparatus is illustrated in FIG. 1. The navigation apparatus shown in FIG. 1 has an outer appearance as shown therein, and has a rectangular shape incorporated into an instrument panel disposed in front of a driver sheet of a passenger vehicle. 1 indicates a casing of the navigation apparatus that is inserted into and fixed to an attachment space provided in the instrument panel. In FIG. 1, the casing 1 is illustrated with a backside portion thereof being omitted.

A panel attachment frame 2 is attached to the front of the casing 1, and a panel main body is housed in the panel attachment frame 2. The panel main body has a display panel 8 by LCD, and a panel frame 3 for attaching the display panel 8 to the apparatus. In the display panel 8 shown in FIG. 1, the front plane thereof is a touch panel on which input/operation buttons related to the navigation apparatus are defined. In a case where the display panel 8 is not of touch panel type, the apparatus may be operated remotely, or input/operation buttons may be arranged in a widened front of the panel frame 2.

The recent in-vehicle navigation apparatus is designed to have multiple functions capable of not only displaying map information on the display panel 8 but also reproducing video images recorded on DVD or the like and music recorded on various types of recording media in the vehicle. Thus, taking into consideration in-vehicle oriented apparatus and a limited attachment space, the navigation apparatus is configured so that the display panel 8 is moved at a slant to release the front of the apparatus in order to effectively use the limited space.

As shown in FIG. 2, the front panel 8 is moved in an inclined state so that the front panel 8 is drawn forwards from the apparatus and is laid down so as to face upwards in order to allow a recording medium such as DVD to be freely loaded into and unloaded from the apparatus. On the front of the navigation apparatus released by moving the display panel 8 in the inclined state, there are provided a slot S1 associated with a function of loading DVD or CD into a drive in the freely detachable manner, and a slot S2 into which a recording medium such as a card or memory can be inserted in the freely detachable manner. An operation button may be arranged on the front of the main body of the navigation apparatus.

The display panel 8 is equipped with the panel frame 3 for attachment to the main body of the navigation apparatus. Slide parts are attached to upper ends of both sides of the panel frame 3. The slide parts are inserted into guide grooves C respectively formed on inner surfaces of both side walls of the panel attachment frame 2, and slide upwards and downwards along the grooves C in accordance with inclined movement of the display panel 8. The slide parts may be not only ones that slide on inner surfaces of the guide grooves C but also rotating rollers having a smaller diameter than that of the width of the grooves.

The inclined movement of the display panel 8 is driven by a drive source for inclined movement installed inside of the navigation apparatus, which may be an electric motor. Two actuator rods 4, which moves horizontally, are connected to the electric motor at two positions in a lower portion of the panel attachment frame 2, or both ends of the lower portion of the frame 2 in the case of FIG. 2. Ends of the actuator rods 4 are joined to the lower portion of the panel frame 3 in a freely rotatable state. Alternatively, a single actuator rod may be arranged so as to move horizontally at the center of the lower portion of the frame 2.

When the navigation apparatus is used for navigation, the display panel 8 is housed in the panel attachment frame 2. When an eject button displayed on the display panel 8 in the touch panel style is depressed in order to load a new DVD to the drive or replace a new DVD with the old one in the drive, for instance, the electric motor is driven so that the actuator rods 4 protrude from the front of the navigation apparatus. Responsive to the motion of the actuator rods 4, the slide parts in the upper ends of the panel frame 3 slide while being restricted by the guide grooves C and move down.

When the actuator rods 4 are moved to protrude from the front, the slide parts moves down along the guide grooves C. As a result of this movement, the display panel 8 shifts from the housed state shown in FIG. 1 to the inclined state shown in FIG. 2. The apparatus is designed so that the actuator rods 4 are automatically stopped when the actuator rods 4 reach the limit on protruding. Preferably, the inclined movement of the display panel 8 is stopped at a residual given angle before the actuator rods 4 become parallel to the panel frame 3. This is intended to make it easy for the slide parts to start to move upwards along the guide grooves C when the display panel 8 is raised by driving the actuator rods 4 to be withdrawn.

Recently, it has been proposed to utilize the multiple functions of the in-vehicle navigation apparatus so that various display functions and display styles are realized on the display panel (for example, a multi-view display panel capable of displaying different images in left and right portions on the display) (see Document 1).

Japanese Patent Application Publication No. 2005-78080

DISCLOSURE OF THE INVENTION

Problems to be Solved by the Invention

However, when the above-mentioned functions and styles are added and implemented, more parts are incorporated into the display panel. This needs a greater volume of the panel main body. However, the instrument panel of the vehicle does not have additional space for accepting the greater volume. Thus, there is a difficulty in increasing the volume of the panel main body.

When an increased number of parts is absorbed by an increased thickness of the panel main body, a further panel housing body must be formed on the backside of the display panel 8, a part or all of the panel main body is no longer housed inside the panel attachment frame line the LCD display panel used in the conventional navigation apparatus. When the panel main body using the display panel 8 is incorporated into the conventional navigation apparatus without any modification, the upper ends of the panel frame may touch the panel attachment frame when the panel main body moves while being inclined. This works against the inclined movement of the panel.

An increased number of parts increases the weight of the display panel 8. The above-mentioned mechanism for inclined movement of the panel body needs increased power of the electric power. However, this increases the cost and driving noise. No additional space is available for accepting a larger-scale electric motor. This works against the design of the navigation apparatus.

The present invention has an object to provide an electronic apparatus in which even a panel main body having an increased thickness or an increased weight can be smoothly moved in an inclined state.

Means for Solving the Problems

The above object is achieved by an electronic apparatus including: an electronic apparatus main body; a panel main body that has a first guided portion guided by a first guide portion formed in the electronic apparatus main body, and moves in an inclined state with respect to the electronic apparatus main body; and a hold member that has a second guided portion guided by a second guide portion formed in the electronic apparatus main body, and slidably holds the panel main body.

With this structure, a mechanism for tilting the panel main body and a mechanism for sliding the panel main body are provided separately from each other, so that the panel main body having an increased weight can be operated smoothly in the inclined state.

In the above structure, there may be employed a structure further including: an actuator part that displaces one of sides of the panel main body; and an engagement portion that slides along a third guide portion provided in the hold member and is provided to the panel main body, wherein: the first guided portion is formed in an upper portion of another one of the sides of the panel main body; the second guided portion is formed in a vicinity of one of ends of the hold member; the electronic apparatus main body has an attachment frame; the first and second guide portions are respectively first and second slide surfaces formed on an inner surface of the attachment frame in parallel facing said one of the sides of the panel main body; and the first and second guided portions slide along the first and second slide surfaces, respectively, and the engagement portion slides in the third guide portion by driving the actuator part.

With this structure, the panel main body can be smoothly moved in the inclined state by driving the actuator part.

In the above structure, the first and second guide portions may have respective rollers.

With this structure, the first and second guided portions may be smoothly guided by the first and second guide portions, respectively. Thus, the panel main body can be smoothly moved in the inclined state.

In the above structure, there may be employed a structure further including: a first attachment portion provided close to said one of the sides of the panel main body; a second attachment portion provided to another one of ends of the hold member; and an urging member that have ends respectively attached to the first and second attachment portions and urges the hold member towards the first attachment portion.

With this structure, a spring urges the hold member towards a lower portion of the panel main body when the panel main body is tilted, and the resultant urging force functions in a direction in which drawing and raising the panel main body can be helped. It is thus possible to smoothly move the panel main body in the inclined state.

In the above structure, the hold member includes hold plates respectively arranged at both sides of the panel main body, and a back plate that is arranged on a back surface of the panel main body and connects the hold plates.

With this structure, the panel main body can be moved in the inclined state more smoothly.

In the above structure, a structure such that the second guide portion has a lower portion that is curved in one of directions in which the actuator part operates may be employed.

With this structure, when the panel main body starts to return from the inclined state, the second guided portion may be guided by the second guide portion more smoothly. Thus, the panel main body can be moved in the inclined state more smoothly.

In the above structure, the second guide portion may be a groove.

In the above structure, the first guide portion may be provided on a front surface of the attachment frame.

In the above structure, there may be employed a structure further comprising a play restraining portion that restrains play between the hold member and the display panel.

A play between the hold member and the display panel is restrained, so that the display panel can be moved smoothly with respect to the hold member, and the panel main body can be moved smoothly in the inclined state.

In the above structure, the play restraining portion may include a fourth guide portion provided in the hold member, and a play restraining member that engages with the fourth guide portion and allows movement of the panel main body with respect to the hold member.

The play restraining member engages with the fourth guide portion formed so as to allow the movement of the display panel. Thus, the panel main body can be moved smoothly with respect to the hold member, and can be tilted smoothly.

In the above structure, the play restraining portion may be configured so as to restrain the distance between a back surface of the panel main body and the hold member. By restraining the distance between the back surface of the panel main body and the hold member, it is possible to prevent the back surface of the panel main body and the hold member from contacting each other and to smoothly move the panel main body with respect to the hold member.

In the above structure, the play restraining portion may include a buffer member that is arranged between a back surface of the panel main body and the hold member and buffers contact between the back surface of the panel main body and the hold member.

The buffer member makes it possible to restrain a play between the hold member and the panel main body and to smoothly move the panel main body with respect to the hold member.

In the above structure, the panel main body may be equipped with a display panel.

In the above structure, the display panel may be configured so as to display individual images on a single screen respectively viewed only in specific directions.

With this structure, it is possible to smoothly move the display panel in the inclined state even when the display panel is heavier and thicker than the normal display panels built in the normal electronic apparatuses.

Effects of the Invention

According to the present invention, a mechanism for tilting the panel main body and a mechanism for sliding the panel main body are provided separately from each other, so that the panel main body having an increased weight can be operated smoothly in the inclined state.

BRIEF DESCRIPTION OF THE DRAWINGS

Preferred exemplary embodiments of the present invention will be described in detail with reference to the following drawings, wherein:

FIG. 3 is a view illustrating a basic configuration of a display apparatus in accordance with an embodiment of the present invention;

BEST MODE FOR CARRYING OUT THE INVENTION

A description will now be given, with reference to the accompanying drawings, of best modes for carrying out the invention.

As an electronic apparatus in accordance with the present invention, an exemplary in-vehicle display apparatus will be described below.

FIG. 3 is a view illustrating a basic configuration of an in-vehicle display apparatus in accordance with an exemplary embodiment of the present invention.

Referring now to FIG. 3, the in-vehicle display apparatus includes a display controller 10 that serves as a display control means, and a display portion 100 as display means. To the display controller 10, image data DT1 is supplied from a first image source 300A that servers as a supply source, and at the same time, image data DT2 is also supplied from a second image source 300B that servers as a supply source. Then, image data ADT, which is composed of the first image data DT1 and the second-image data DT2, is output to the common display portion 100. The configuration of the display controller 10 will be described later in detail.

The first image source 300A and the second image source 300B are respectively composed of a camera, TV receiver, DVD reproducing portion, HD reproducing portion, navigation portion, and the like, as will be described later.

The display portion 100 (panel main body or display panel) includes: a liquid crystal panel; a backlight; a parallax barrier; and the like, as will also be described later. A first image IM1 based on the first image data DT1 and a second image IM2 based on the second image data DT2 are displayed on a common display screen so that an observer OBR can watch the first image IM1 from a right-hand direction and an observer OBL can watch the second image IM2 from a left-hand direction. The configuration of the display portion 100 will also be described later in detail.

Figure 4:
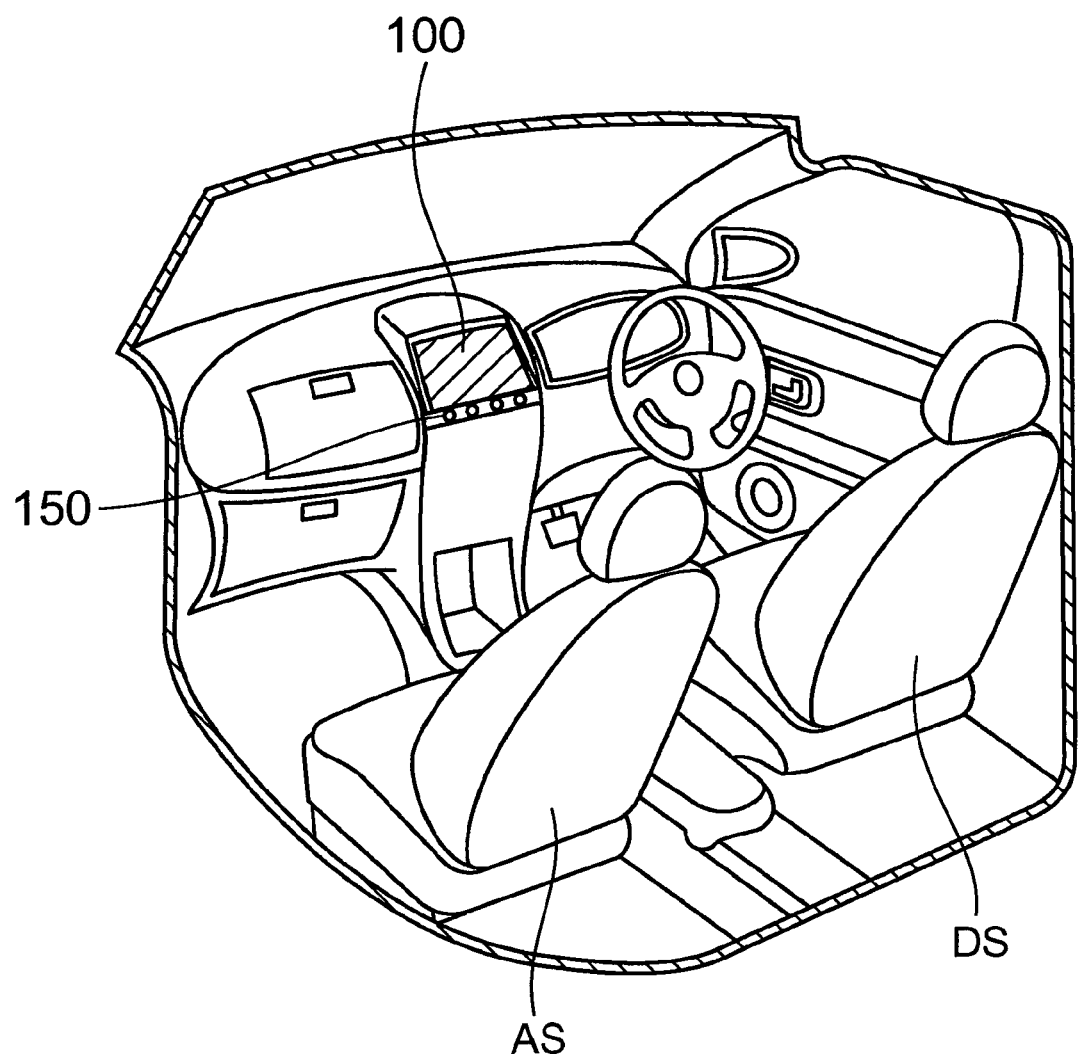
FIG. 4 is a perspective view showing an example in which the display apparatus is applied to a vehicle.

Referring now to FIG. 4, the display portion 100 of, for example, of the display apparatus employed in the first exemplary embodiment is arranged between a driver's seat DS and a front passenger's seat AS in a dashboard area of the vehicle. In addition, the display portion 100 is provided with the operation button portion 150 so as to manually operate the display apparatus. According to an exemplary embodiment shown in FIG. 5, a passenger who sits on the driver's seat DS corresponds to the above-described observer OBR, and another passenger who sits on the front passenger's seat AS corresponds to the above-described observer OBL. Those passengers are able to simultaneously watch individual images, namely, the first image IM1 and the second image IM2, which are respectively different and displayed on the display portion 100, from the driver's seat DS and from the front passenger's seat AS.

Figure 5:
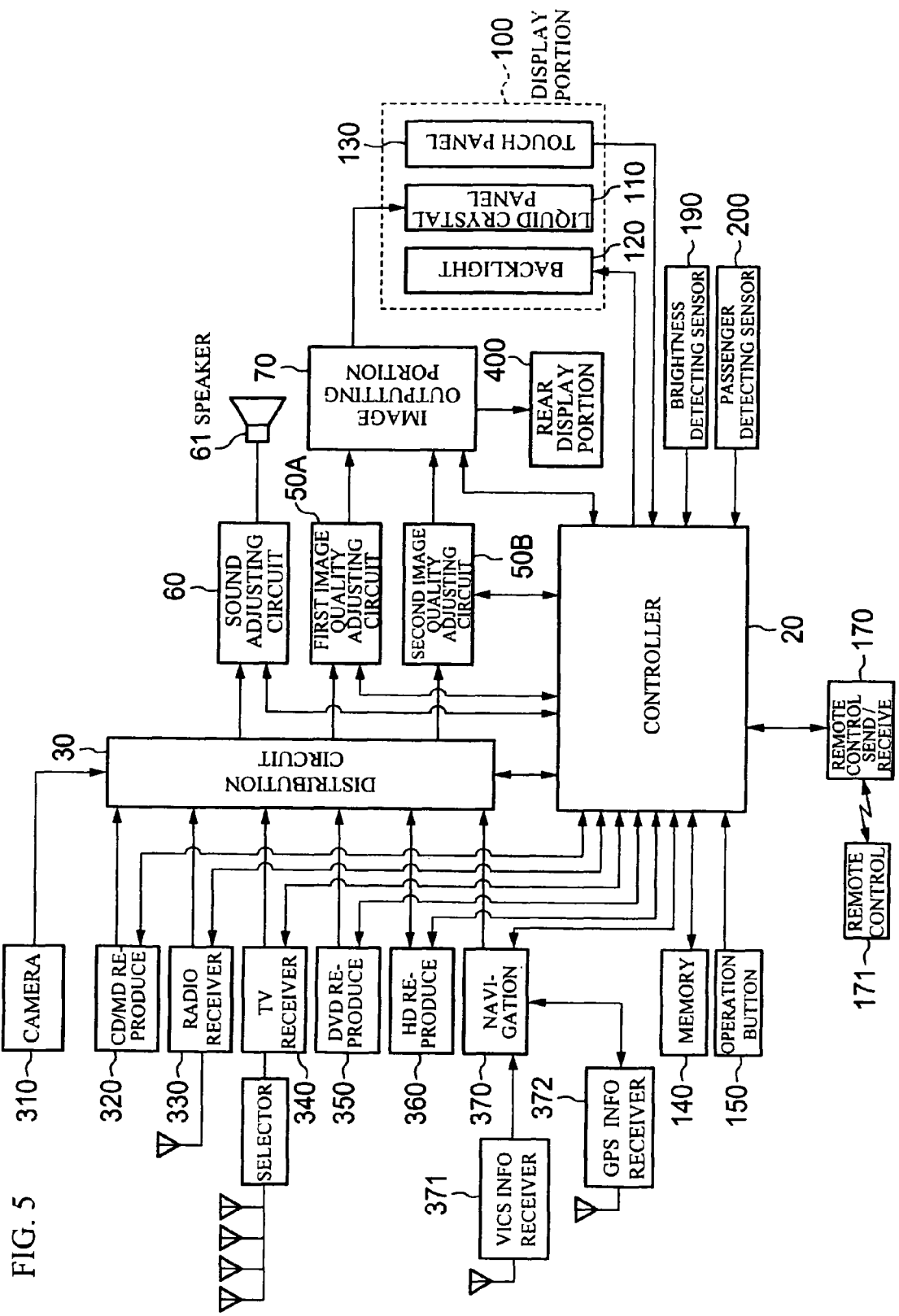
FIG. 5 is a functional block diagram of the display apparatus.
Figure 6:
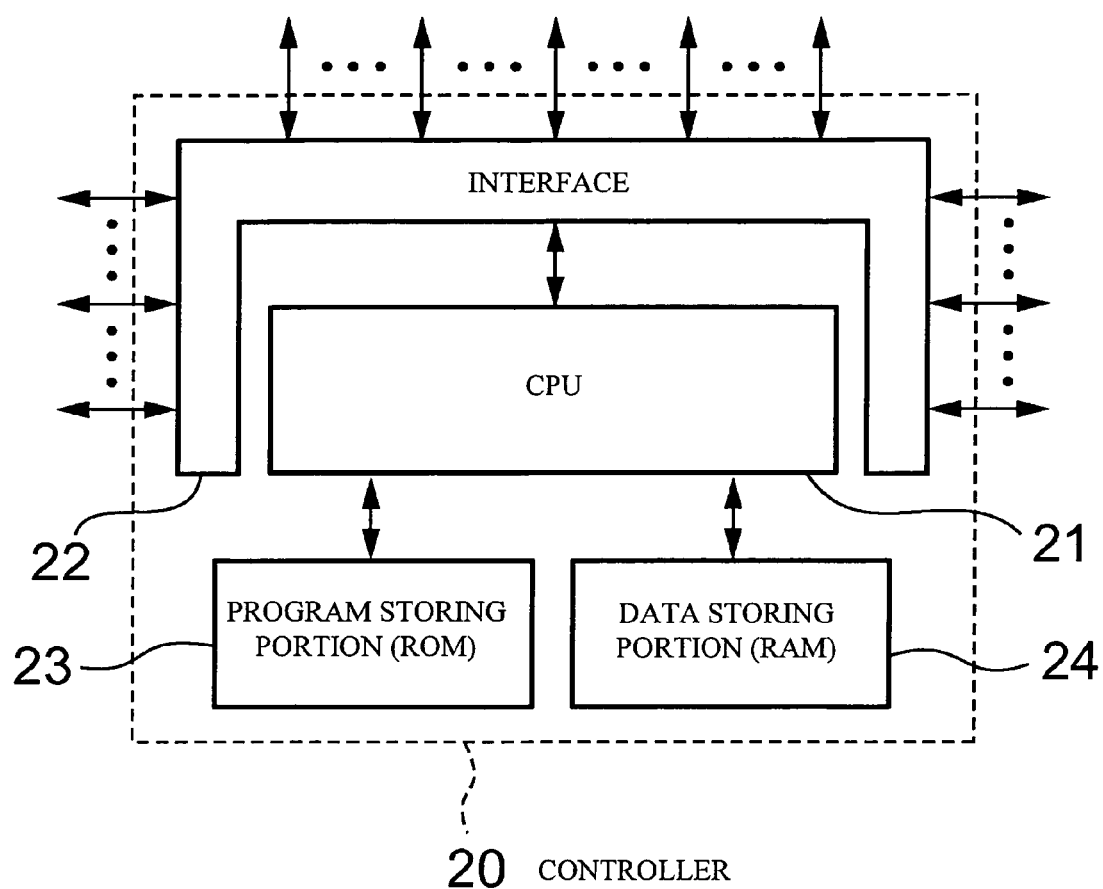
FIG. 6 is a functional block diagram-showing a configuration of a controller.
Figure 7:
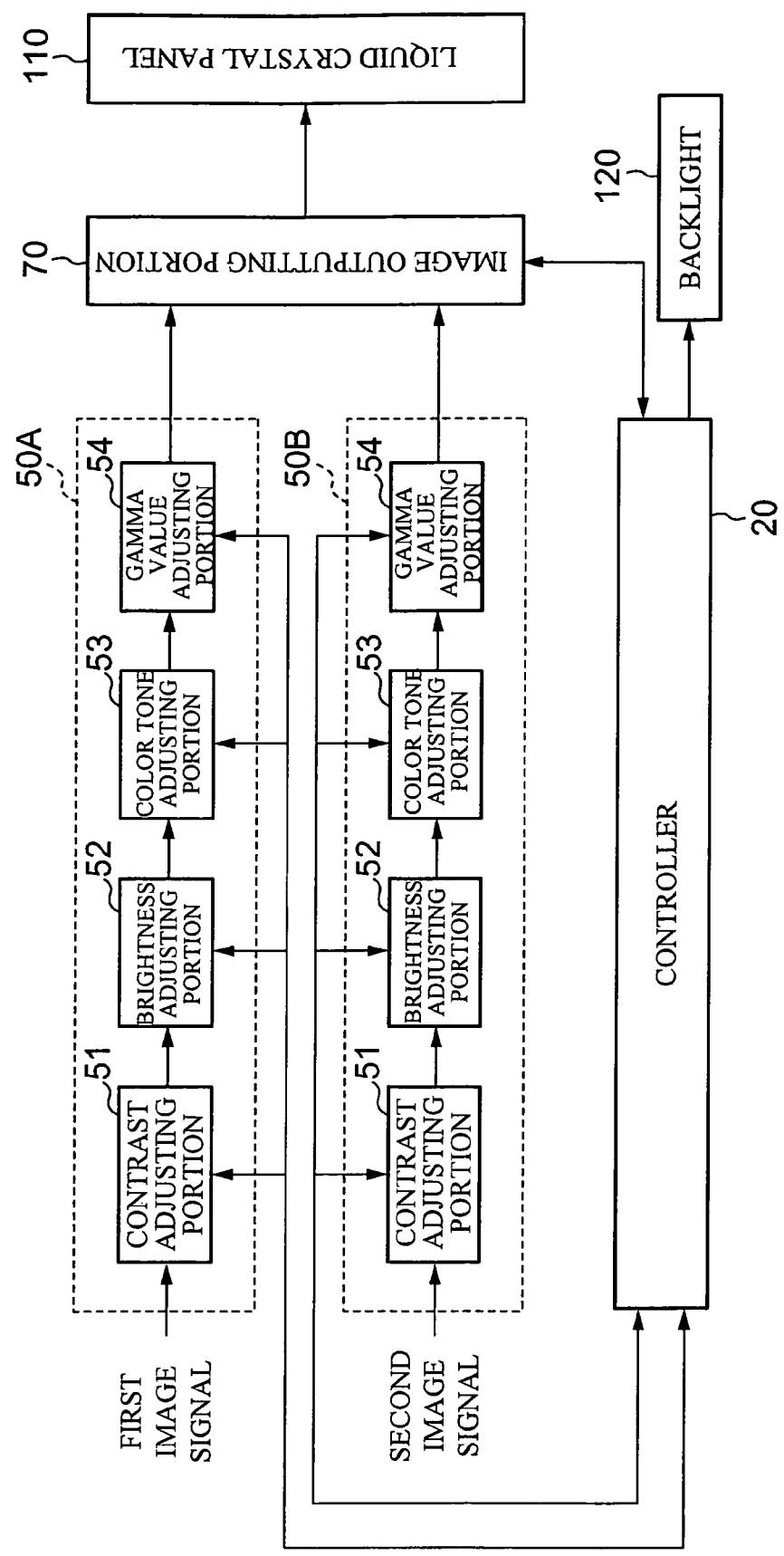
FIG. 7 is a functional block diagram of first and second image quality adjusting portion.
Figure 8:
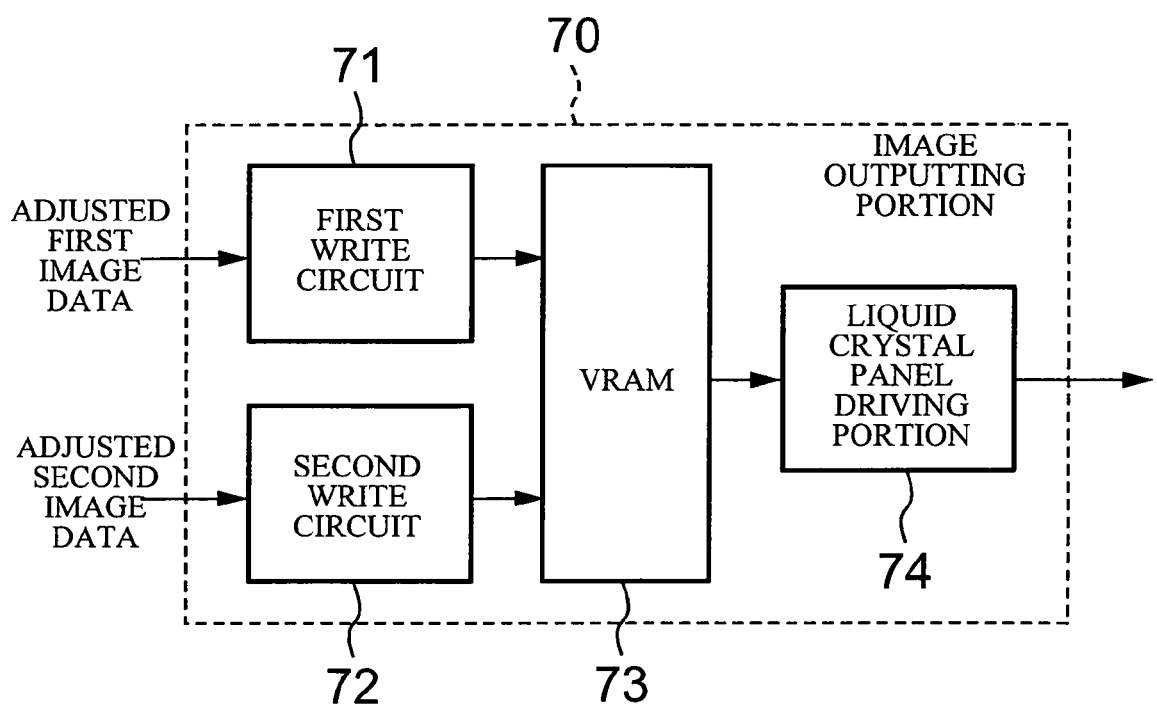
FIG. 8 is a functional block diagram of an image outputting portion.
Figure 9:
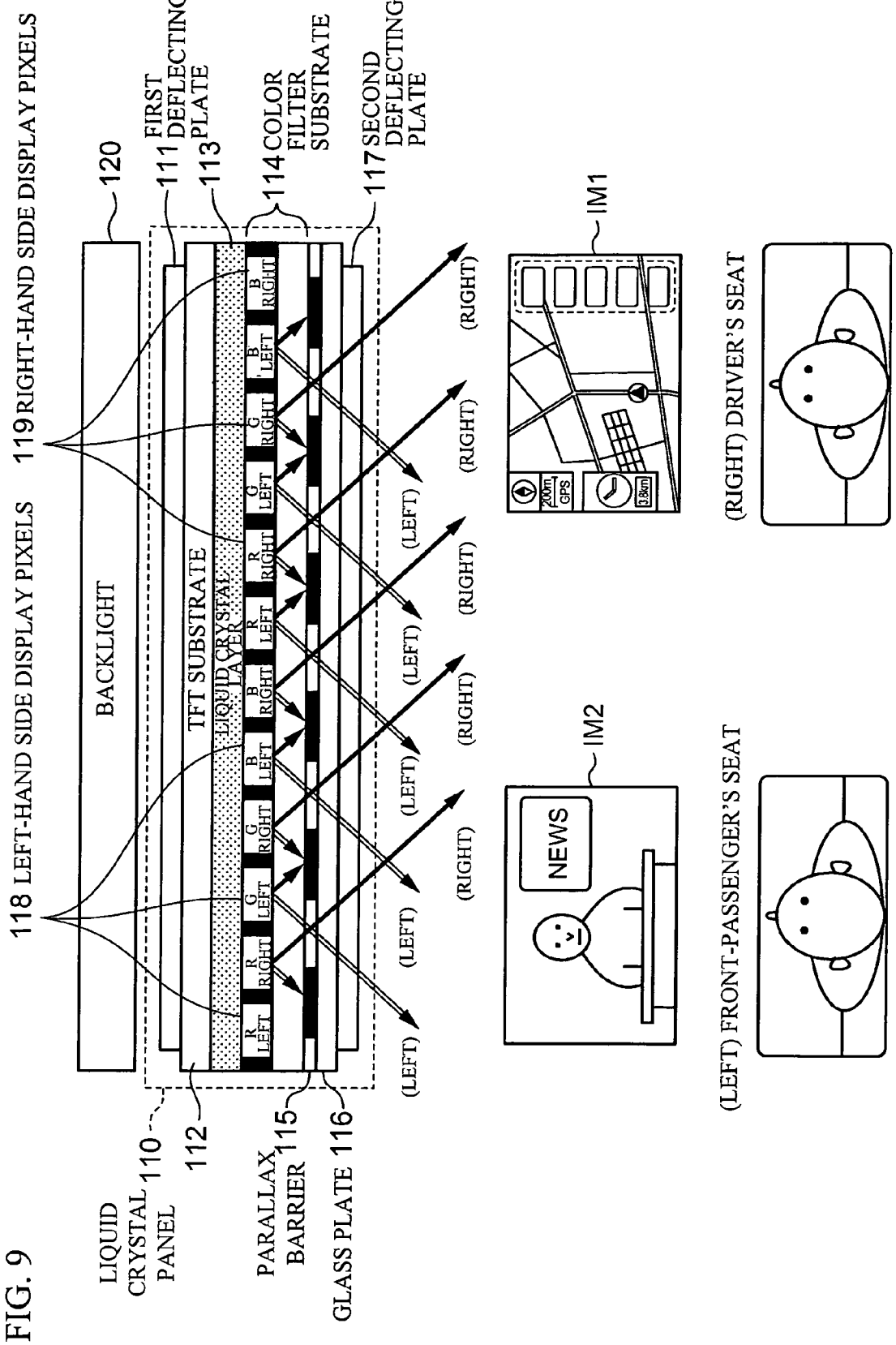
FIG. 9 is a view illustrating a cross-sectional configuration of a display portion.
Figure 10:
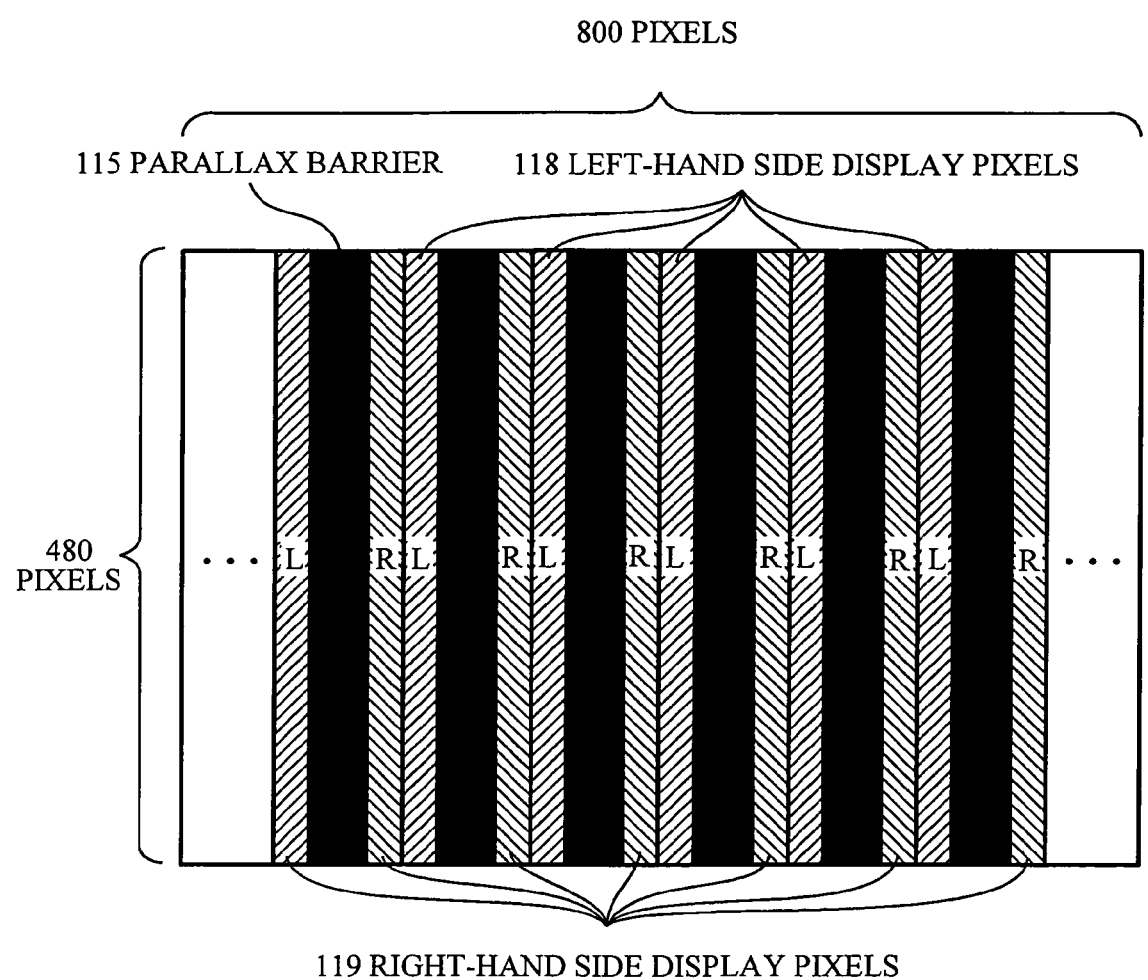
FIG. 10 is a front view of a liquid crystal panel.
Figure 11:
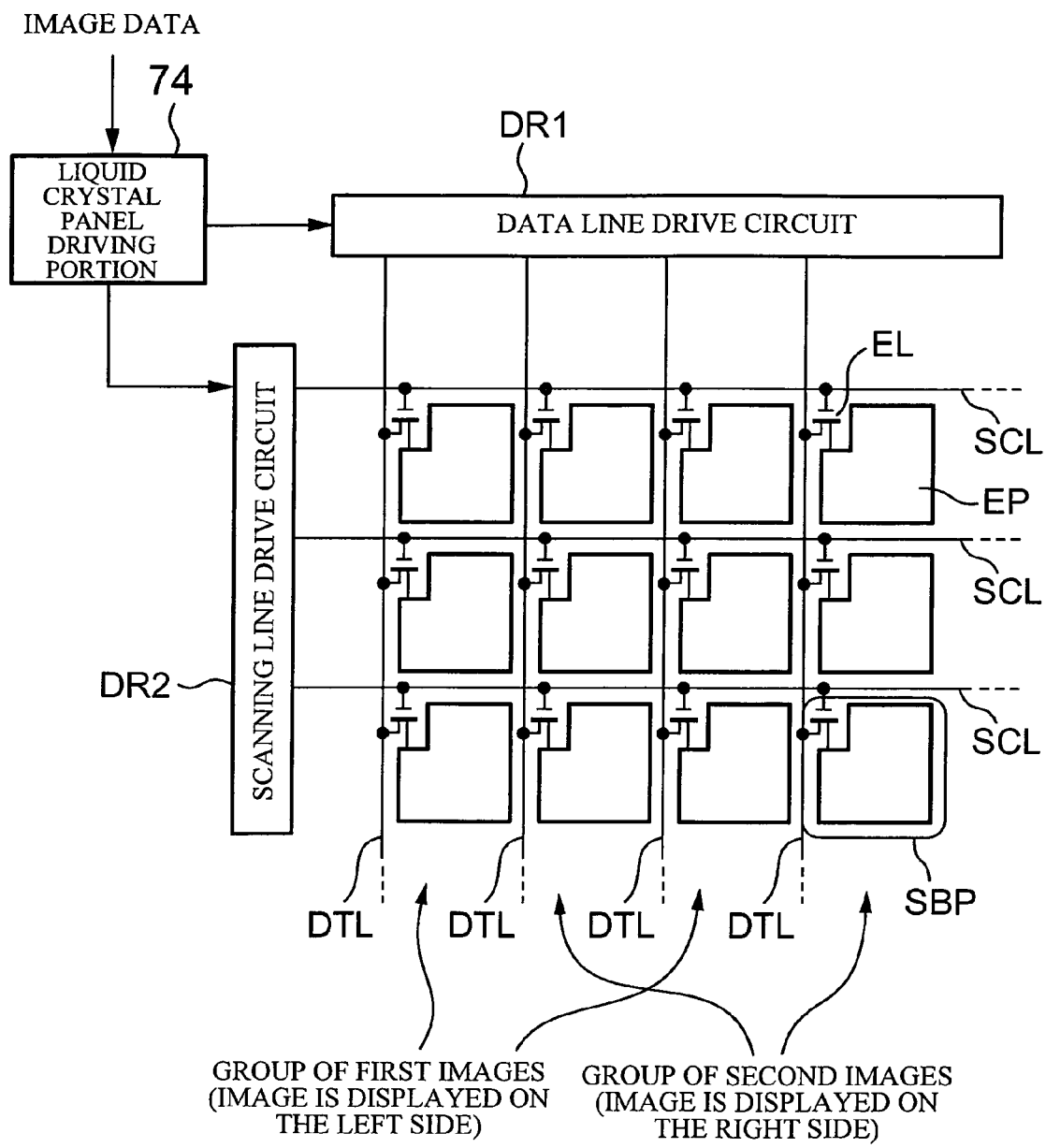
FIG. 11 is a circuit diagram of a TFT substrate.

FIG. 5 through FIG. 11 illustrate specific configurations of the display apparatus in accordance with the first exemplary embodiment of the present invention. FIG. 5 is a functional block diagram of the display apparatus. FIG. 6 is a functional block diagram showing a configuration of the controller. FIG. 7 is a functional block diagram of first and second image quality adjusting circuits. FIG. 8 is a functional block diagram of an image outputting portion. FIG. 9 is a view illustrating a cross-sectional configuration and effects of a liquid crystal panel. FIG. 10 is a front view of the liquid crystal panel. FIG. 11 is a circuit diagram of a TFT substrate.

Referring now to FIG. 5, the display apparatus includes the display portion 100, a controller 20, a distribution circuit 30, a first image quality adjusting circuit 50A, a second image quality adjusting circuit 50B, an image outputting portion 70, and the like. The display controller 10 includes the controller 20, the distribution circuit 30, the first image quality adjusting circuit 50A, the second image quality adjusting circuit 50B, the image outputting portion 70, and the like.

Referring now to FIG. 6, the controller 20 includes a processor (CPU) 21, an interface 22, a ROM 23, a RAM 24, and the like. The controller 20 controls the display apparatus according to a program stored in the ROM 23 in a comprehensive manner. Also, the controller 20 controls a visible range of the first image IM1 and a visible range of the second image IM1, which are separated from each other by superimposing the first image IM1 and the second image IM2 to be displayed on the display portion 100, by adjusting the image quality of at least one of the first image IM1 and the second image IM2 to have a given range.

The controller 20 is connected to a camera 310, a compact disc/mini disc (CD/MD) reproducing portion 320, a radio receiver 330, a TV receiver 340, a digital versatile disc (DVD) reproducing portion 350, a hard disc (HD) reproducing portion 360, a navigation portion 370, and the like, so as to send and receive data and control the afore-described components, which are mounted on a vehicle and respectively serve as supply sources supplying images and sounds, as illustrated in FIG. 5. The camera 310 captures images of surroundings and the like of the vehicle. The CD/MD reproducing portion 320 reproduces music or images. The radio receiver 330 receives radio waves via an antenna. The TV receiver 340 receives TV waves via an antenna through a selector 341. The DVD reproducing portion 350 reproduces music information and images in a DVD. The HD reproducing portion 360 reproduces images and music information stored in a HD. The navigation portion 370 outputs maps or route guide images on the basis of road information received by a VICS information receiver 371 and geographic information received by a GPS information receiver 372.

Additionally, the controller 20 is also connected to an external memory 140, the operation button portion 150, a remote control send and receive portion 170, a brightness detecting sensor 190, a passenger detecting sensor 200, and the like, and enables various controls on the basis of various kinds of data obtained from the afore-mentioned components. The external memory 140 stores various kinds of data. The operation button portion 150 is provided for operating the display apparatus. The remote control send and receive portion 170 sends and receives infrared signals or wireless signals between a remote controller 171 provided for controlling the display apparatus remotely. The brightness detecting sensor 190 is composed of a light switch or a light sensor to detect the brightness inside the vehicle. The passenger detecting sensor 200 is composed of a pressure-sensitive sensor or the like on the driver's seat or the front passenger's seat to detect a passenger in the vehicle.

The distribution circuit 30, as illustrated in FIG. 5, distributes sound data and image data supplied from the above-described camera 310, the CD/MD reproducing portion 320, the radio receiver 330, the TV receiver 340, the DVD reproducing portion 350, the HD reproducing portion 360, the navigation portion 370, and the like, to the first image quality adjusting circuit 50A or the second image quality adjusting circuit 50B, according to a control instruction issued by the controller 20.

A sound adjusting circuit 60 adjusts the sound data supplied from the distribution circuit 30 to output to a speaker 61, as illustrated in FIG. 5.

Each of the first image quality adjusting circuit 50A and the second image quality adjusting circuit 50B, by reference to FIG. 7, includes a contrast adjusting portion 51, a brightness adjusting portion 52, a color tone adjusting portion 53, a gamma value adjusting portion 54, and the like, and respectively adjusts the image qualities (contrast, brightness, color tone, and gamma value) of the first image data and the second image data, in response to the control instruction issued by the controller 20.

Referring now to FIG. 8, the image outputting portion 70 includes a first write circuit 71, a second write circuit 72, a video RAM (VRAM) 73, a liquid crystal panel driving portion 74, and the like. The first image data and the second image data, image qualities of which have respectively been adjusted by the first image quality adjusting circuit 50A and the second image quality adjusting circuit 50B, are respectively written into the first write circuit 71 and the second write circuit 72. The first write circuit 71 and the second write circuit 72 respectively write the first image data and the second image data, the image qualities of which are respectively adjusted by the first image quality adjusting circuit 50A and the second image quality adjusting circuit 50B, into given addresses of the VRAM 73, in order to superimpose such adjusted first image data and such adjusted second image data.

The VRAM 73 retains the image data on which the first image data and the second image data are superimposed. Such superimposed image data corresponds to respective pixels of the display portion 100. The liquid crystal panel driving portion 74 is a circuit that drives a liquid crystal panel 110, and also drives the corresponding pixels of the liquid crystal panel 110, on the basis of the superimposed image data retained in the VRAM 73. The liquid crystal panel 110 will be described later in detail.

The display portion 100 includes: the liquid crystal panel 110; a backlight portion 120; a touch panel 130; and the like, as illustrated in FIG. 5. The backlight portion 120 sheds illuminated lights from the back surface of the liquid crystal panel 110. The touch panel 130 is provided for inputting a signal to operate the display apparatus. Here, the touch panel 130 is not shown, yet is formed in a shape of transparent sheet and adhered to the front surface of the liquid crystal panel 110.

Referring now to FIG. 9, the liquid crystal panel 110 has a known structure. Sequentially from the backlight portion 120, there are provided a first deflecting plate 111, a thin film transistor (TFT) substrate 112, a liquid crystal layer 113, a color filter substrate 114 having pixels for three primary colors of RGB, a parallax barrier 115, a glass plate 116, a second deflecting plate 117, and the like.

The above-described liquid crystal panel 110 has a display screen in which, for example, 800 pixels are arranged in a horizontal direction and 480 pixels in a vertical direction, as illustrated in FIG. 9 and FIG. 10. Also, left-hand side display pixels 118 (hereinafter, also referred to as front passenger's display pixel 118) and right-hand side display pixels 119 (hereinafter, also referred to as driver's display pixel 119) are alternately arranged in a horizontal direction of the display screen.

The parallax barrier 115 is formed in a stripe-shaped manner, and includes shielding portions and transmitting portions, as illustrated in FIG. 9 and FIG. 10. The shielding portions are arranged between the left-hand side display pixels 118 and the right-hand side display pixels 119. By providing the parallax barrier 115 on the front surface of the color filter substrate 114, among the illuminated lights that have passed through the left-hand side display pixels 118, only the lights going towards the left side selectively pass through the transmitting portions of the parallax barrier 115. Among the illuminated lights that have passed through the right-hand side display pixels 119, only the lights going towards the right side selectively pass through the transmitting portions of the parallax barrier 115. This makes the first image IM1 visible from the right side (the driver's seat) of the liquid crystal panel 110, and also makes the second image IM2 visible from the left side (the front passenger's side).

Here, a similar parallax barrier as disclosed in Japanese Patent Application Publication No. 10-123461 or Japanese Patent Application Publication No. 11-84131 may be employed for the parallax barrier 115.

The TFT substrate 112, by reference to FIG. 11, includes a data line drive circuit DR1, a scanning line drive circuit DR2, vertically arranged scanning lines SCL, horizontally arranged data lines DTL, TFT elements EL, pixel electrodes EP corresponding to the TFT elements EL, and the like, whereas each of the TFT elements EL is formed in each region where each of the scanning lines SCL and each of the data lines DTL are crossed. Sub pixels SBP are formed by regions surrounded by the scanning lines SCL and the data lines DTL, and the sub pixels SBP arranged along each of the data lines DTL are alternately assigned to the left-hand side display pixels 118 and the right-hand side display pixels 119.

A drive timing of the data line drive circuit DR1 is controlled by the liquid crystal panel driving portion 74 to control a voltage applied to the pixel electrode EP.

A drive timing of the scanning line drive circuit DR2 is controlled by the liquid crystal panel driving portion 74 to selectively scan the TFT element EL.

Figure 12:
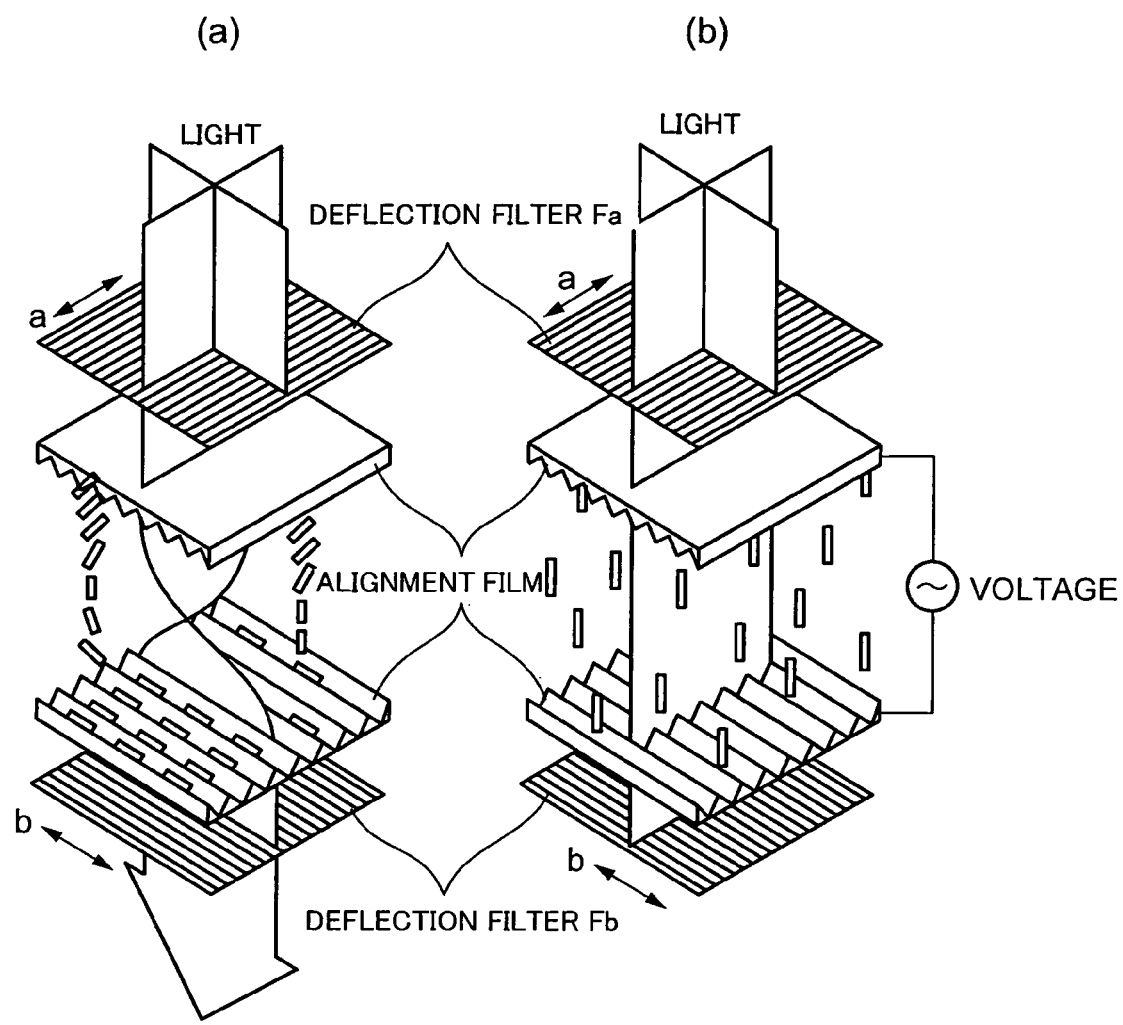
FIG. 12 is a view describing the principles of operation of liquid crystal.
Figure 13:
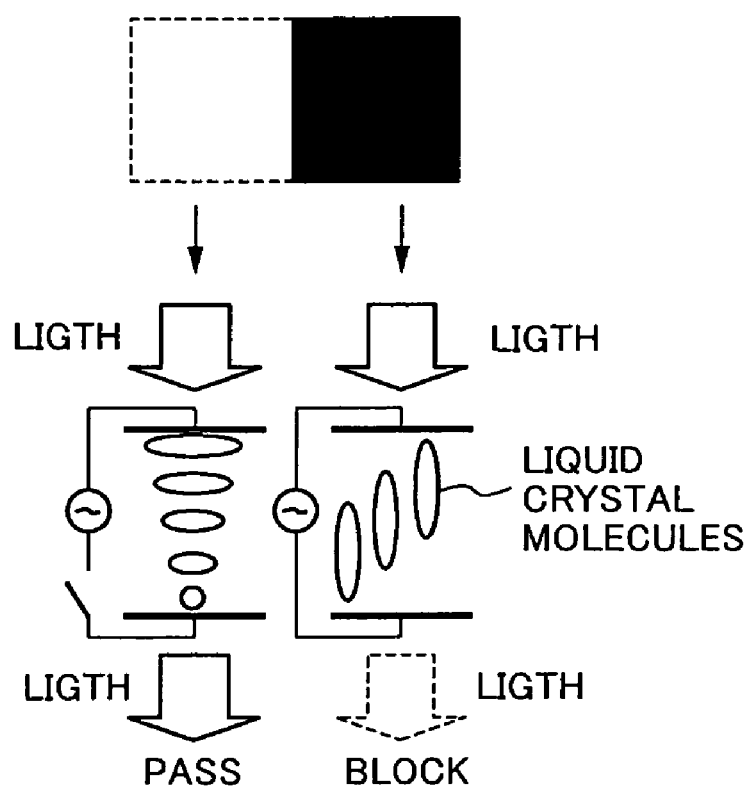
FIG. 13 is a view describing a function of liquid crystal as a shutter.

Here, a description will now be given, with reference to FIGS. 12 and 13, of the principles of driving a TN (Twisted Nematic) type liquid crystal as an example of liquid crystal. As shown in part (a) of FIG. 12, in the TN type liquid crystal, twisted liquid crystal is interposed between two deflection filters Fa and Fb (deflection plates) arranged to have mutually orthogonal deflecting directions for preventing light from pass therethrough. Incident light to top of the liquid crystal is guided by the liquid crystal helix and is twisted by 90 degrees. Thus, the light is allowed to pass through the lower deflection filter Fb. As shown in part (b) of FIG. 12, when a voltage is applied to the liquid crystal molecules, the molecules are caused to stand upright and are released from the twisted state. Thus, the incident light goes downwards without any change, and is prevented from passing through the lower filter Fb. That is, as shown in FIG. 13, light is allowed to pass through the liquid crystal when no voltage is applied to the liquid crystal molecules, and is blocked so that the screen is black when the voltage is applied. The liquid crystal functions as a shutter responsive to the voltage applied thereto. Thus, luminance control can be implemented by controlling the voltage applied to the liquid crystal. Further, luminance control of images on the left-side and right-side display portions can be implemented independently by separately controlling the voltages applied to liquid crystals respectively for the left-side and right-side display mages.

The memory 140 may be formed by an electrically programmable and erasable memory such as a flash memory or a battery-backup volatile memory, and stores data necessary for control by the controller 20. More specifically, the memory 140 stores setting information for setting a visible range that will be described later, and vehicle information about the handle position of the vehicle.

A description will be given, with reference to FIG. 14 through FIG. 17, of opening and closing operations of the in-vehicle display apparatus.

Figure 1:
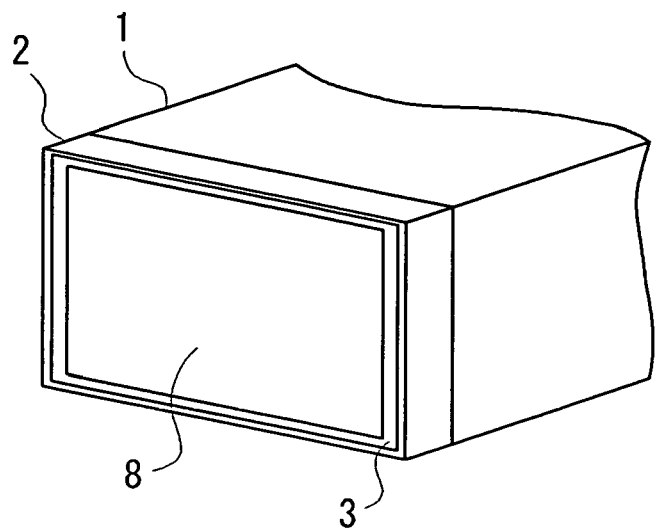
FIG. 1 is a view describing a navigation apparatus having a conventional panel tilting apparatus.
Figure 2:
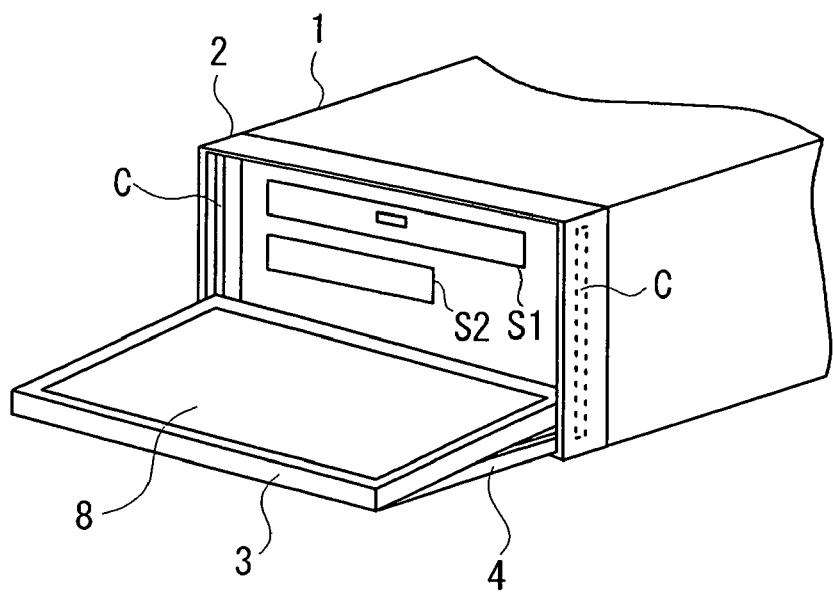
FIG. 2 is a view showing an outer appearance of the apparatus when the display panel is moved and inclined in the navigation apparatus shown in FIG. 1.
Figure 14:
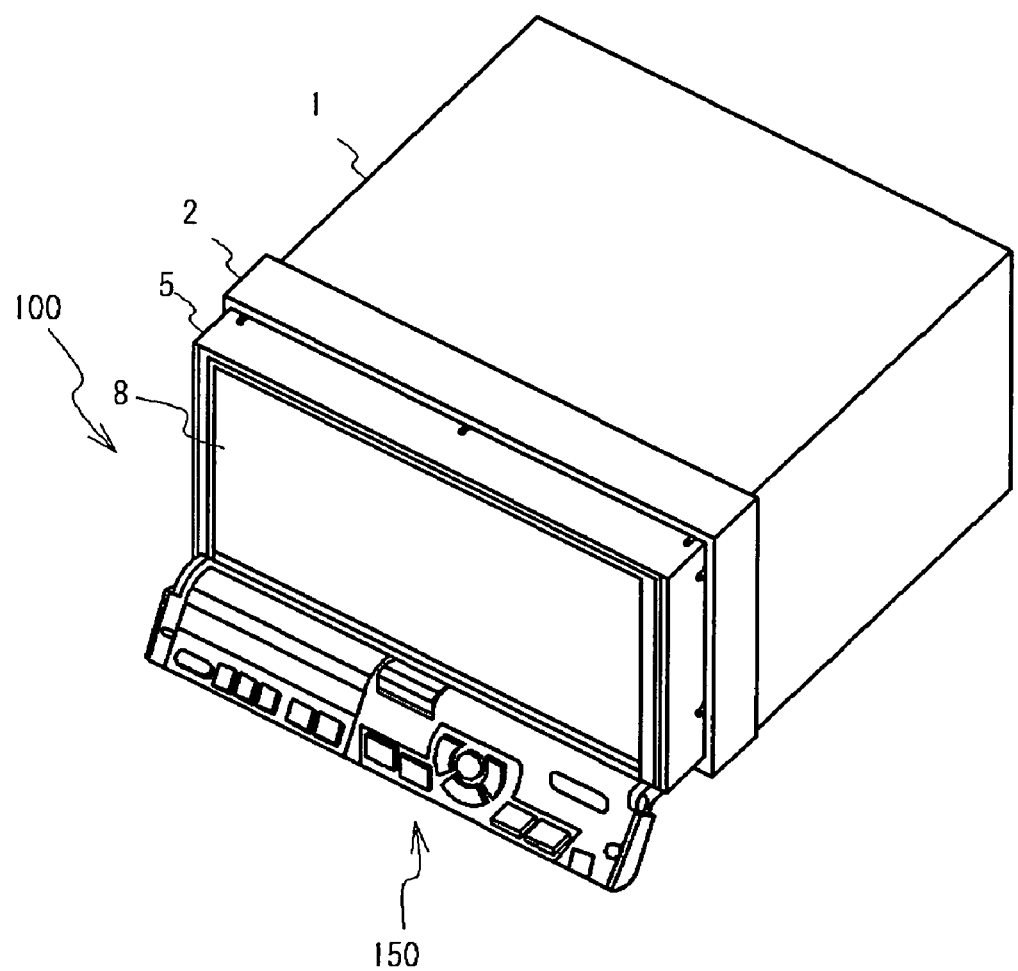
FIG. 14 is a perspective view of the in-vehicle display apparatus in a state where the display panel stands upright.
Figure 15:
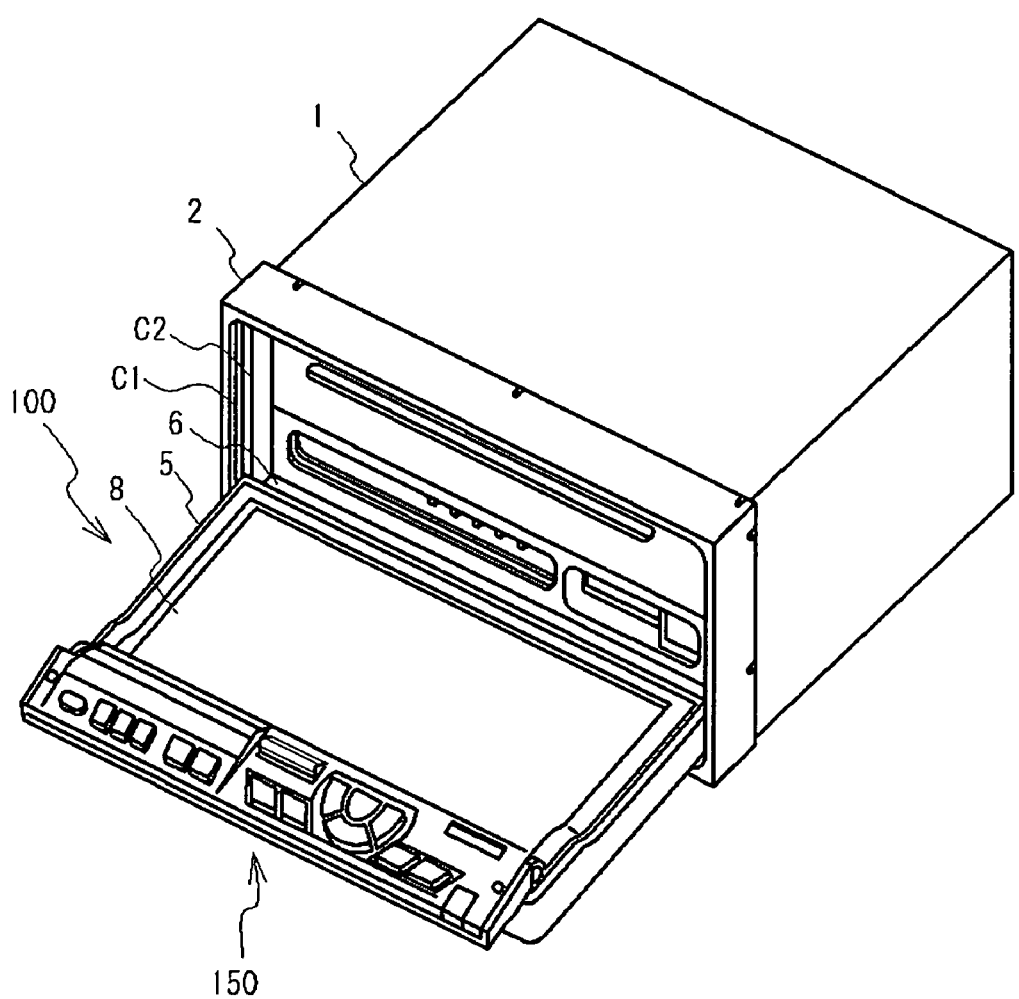
FIG. 15 is a perspective view of the in-vehicle display apparatus in which the display panel is moved and inclined so that the front surface of the apparatus main body is exposed.

FIG. 14 is a perspective view of the in-vehicle display apparatus with the panel main body stands upright. FIG. 15 is a perspective view of the in-vehicle display apparatus in a state in which the panel is inclined and the front of the apparatus main body is exposed. The in-vehicle display apparatus shown in FIGS. 14 and 15 is based on the conventional navigation apparatus shown in FIGS. 1 and 2, and the same parts are given the same reference numerals. That is, a navigation unit is built in an apparatus main body 1, and a panel attachment frame 2 is fixed to the front of the apparatus main body 1. When the panel main body having the display panel 8 is inclined by the actuator rods 4, a recording medium such as DVD that realizes the multiple functions of the navigation unit can be operated. The display portion 100 is made up of the display panel 8, a panel frame 5 and a hold plate 6.

The in-vehicle display apparatus of the present embodiment greatly differs from the aforementioned conventional in-vehicle display apparatus in that a single guide groove C is formed in an inner surface of a side wall of the panel attachment frame 2, and a slide part attached to the upper end of the panel frame 3 slides in the guide groove C when the actuator rod 4 is driven.

In contrast, the in-vehicle display apparatus of the present invention is equipped with the apparatus main body 1 (electronic apparatus main body), a panel main body that has a slide part (first guided part) guided by a guide groove C1 (first guide portion, first slide surface) provided to the apparatus main body 1 and can move in an inclined state with respect to the apparatus main body 1, and the hold plate 6 that has another slide part (second guided part) guided by a guide groove C2 provided in the apparatus main body 1 and slidably supports the panel main body. With this structure, the mechanism for tilting the panel main body and the mechanism for sliding the panel main body are provided separately from each other, so that the panel main body having an increased weight can be operated smoothly in the inclined state.

More specifically, in the present in-vehicle display apparatus, two parallel guide grooves C1 and C2 are provided on the inner surface of a side wall of the panel attachment frame (attachment frame) 2. The slide part attached to the top end of the panel frame 5 engages with the guide groove C1 and slides. The other slide part attached to an end of the hold plate, which will be described below, engages with the guide groove C2 and slides. The panel frame 5 and the hold plate 6 are joined by a spring 7 (urging member). In the in-vehicle display apparatus of the present embodiment configured as described above, when the actuator rods 4 are driven and the panel slides in the inclined state, the spring 7 urges the hold plate 6 towards the lower portion of the panel main body. The spring force pulls the panel frame 5 and the hold plate 6 and helps the display panel 8 to be raised up. In addition, the spring force restrains play with the panel frame 5 and realizes smooth sliding of the panel main body in the inclined state.

Now, a description will be given, with reference to FIGS. 16A and 16B, of the structure of the in-vehicle display apparatus having the panel tilting apparatus in accordance with the present embodiment.

Figure 16A:
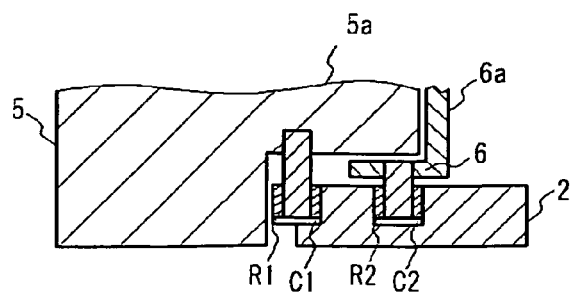
FIGS. 16A and 16B are diagrams for describing a state in which the display panel stands upright.
Figure 16B:
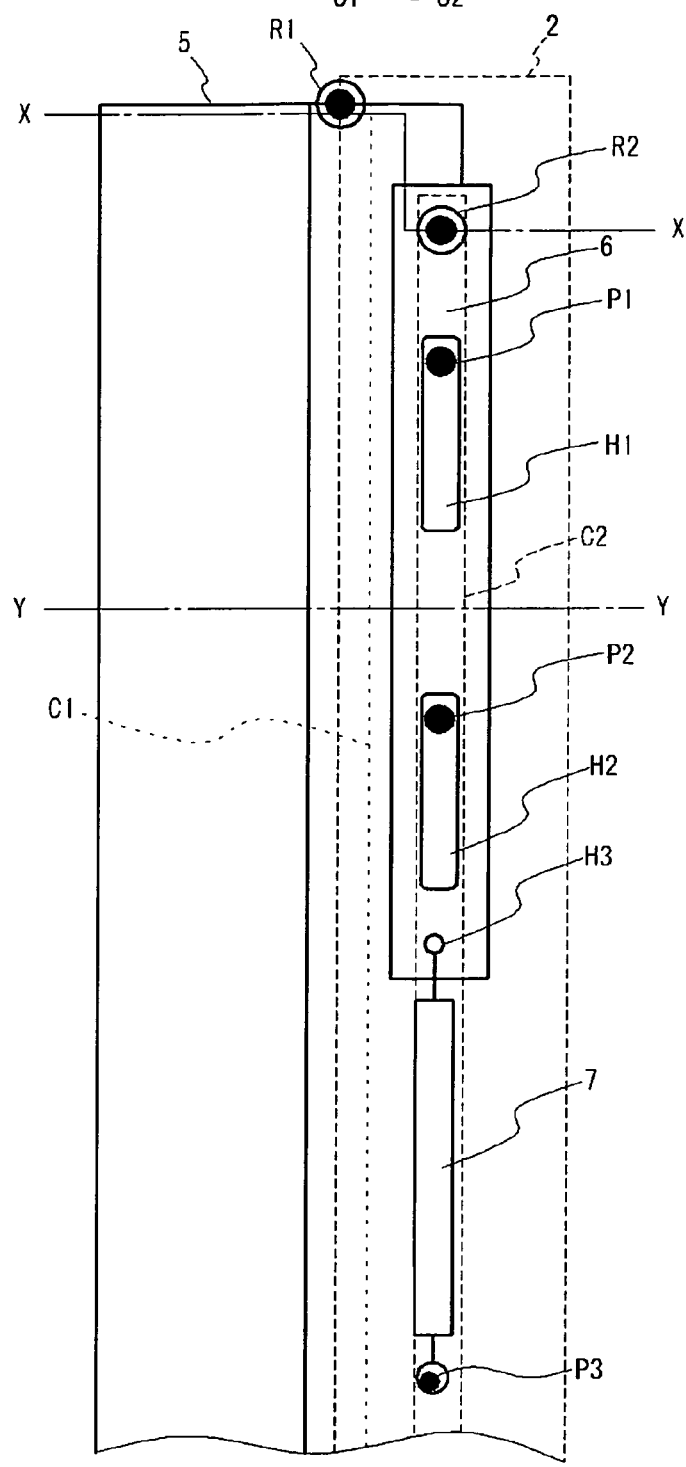

FIGS. 16A and 16B show the in-vehicle display apparatus in which the display panel stands upright. FIG. 16A is a cross-sectional view of an upper portion of the in-vehicle display apparatus taken along a line X-X shown in FIG. 16B, and FIG. 16B is a side view that mainly shows a structure of the in-vehicle display apparatus related to the panel frame 5.

The panel attachment frame 2 is depicted by broken lines. The contour of the panel attachment frame 2 is illustrated by a thick broken line, and the guide grooves C1 and C2 formed on the side wall of the panel attachment frame 2 are illustrated by thin broken lines. Although only one side of the panel frame 5 is illustrated in FIGS. 16A and 16B, it is desired to provide the in-vehicle display apparatus with the panel tilting apparatuses of the present embodiment on the opposite side walls of the panel frame 5. In this case, the panel can be tilted more stably. The panel attachment frame 2 may be made of a metal such as an aluminum alloy or a rigid plastic material.

As shown in FIG. 16B, the panel frame 5 is made thicker than the panel frame 3 of the conventional navigation apparatus. In addition, the panel frame 5 protrudes from the panel attachment frame 2 forwards when the panel main body is housed. A housed panel main body 5a is provided to the backside of the panel frame 5, and is designed so as to be housed within the panel attachment frame 5 when the display panel 8 is housed. In the exemplary structure shown in FIG. 16B, the upper surface of the panel frame 5 is flush with the upper surface of the housed panel main body 5a, and a step is defined between the upper surface of the panel frame 5 and the upper surface of the panel attachment frame 2 when the panel is housed. This step prevents the upper end surface of the panel frame 5 from hitting the front surface of the upper side wall of the panel attachment frame 2.

A description will be given of a slide part that is attached to the housed panel main body 5a and is a component of the panel tilting apparatus. In the embodiment shown in FIGS. 16A and 16B, the slide part is a roller having a small diameter. The roller R1 has a shaft attached to an upper end of a side wall of the housed panel main body 5a so that the roller R1 can be rotated within the guide groove C1 formed on the inner wall of the panel attachment frame 2. The roller R1 moves up and down when the panel main body slides in the tilted state, so that the panel main body can be stabilized. With the above structure, the roller R1 may be smoothly guided by the guide groove C1, and the panel main body can slide smoothly in the tilted state.

The hold plate 6, which is a component of the panel tilting apparatus, will now be described. The size of the outer shape of the housed panel main body 5a can be determined so that a given gap can be formed between the side wall surface of the housed panel main body 5a and the inner surface of the panel attachment frame 2. The hold plate 6 having a given length in the longitudinal direction of the side wall of the housed panel main body 5a is arranged in the given gap in engagement.

The support plates 6 are disposed along the both of the opposite side walls of the housed panel main body 5a, and are joined by a support back plate 6a on the backside of the housed panel main body 5a. The hold plates 6 and the support back plate 6a may be integrally formed by punching of a metal plate or by forming separate members and joining together. The plates may be made of rigid plastic. The hold plates 6 and the support back plate 6a correspond to a hold member.

The slide part associated with the guide groove C2 formed on the inner surface of the panel attachment frame 2 is attached to an end of the hold plate 6, in other words, an upper end of the hold plate 6 with respect to the panel housed state. In the embodiment shown in FIGS. 16A and 16B, the slide part is the roller R2 having a small diameter. The roller R2 is axially supported by the upper end of the hold plate 6 so that the roller R2 can be rotated within the guide groove C2. The roller R2 moves up and down along the slide surface of the guide groove C2 and restricts the position of the upper end of the hold plate 6. With this structure, the roller R2 can be smoothly guided by the guide groove C2, and the panel main body can also slide smoothly in the inclined state.

Further, as shown in FIG. 16B, pin engagement long holes H1 and H2 (third guide portions) having given lengths in the longitudinal direction of the hold plate 6 are formed in the hold plate 6 at a given interval. Engagement pins P1 and P2 (engagement parts) fixed to the side wall of the housed panel main body 5a are inserted into the long holes H1 and H2 so as to move within respective given ranges defined by the long holes. When the panel main body slides in the inclined state, the engagement pins P1 and P2 moves in the pin engagement long holes H1 and H2 in engaged state. In the panel housed state shown in FIG. 16B, the engagement pins P1 and P2 are positioned in the upper portions of the pin engagement long holes H1 and H2. The positions of the engagement pins P1 and P2 and the pin engagement long holes H1 and H2 are aligned with each other. The engagement pins P1 and P2 are provided to the panel main body, and slide along the in engagement long holes H1 and H2 formed in the hold plate 6.

In the panel tilting apparatus of the present embodiment, the two pin engagement long holes are provided in the hold plate 6 and two corresponding pins are provided. The panel tilting apparatus may be varied so as to have a single pin engagement long hole and a single engagement pin. It is also possible to provide two pins for a single long hole taking into consideration a range in which the two pins relatively move.

As shown in FIG. 16B, a spring attachment hole H3 (second attachment part) is provided in a lower end of the hold plate 6. The spring 7 is provided between the spring attachment hole H3 and a spring attachment pin P3 (first attachment part) fixed to the lower portion of the side wall of the housed panel main body 5a. The spring 7 joins the housed panel main body 5a and the hold plate 6. Although the spring 7 operates as will be described later, when the actuator rods 4 are driven to tilt the panel main body, the hold plate 6 and the lower portion of the housed panel main body 5a are displaced, so that the spring 7 pulls the hold plate 6 and the lower portion of the panel main body. That is, the both ends of the spring 7 are attached to the spring attachment pint P3 and the spring attachment hole H3, and urges the hold plate 6 towards the spring attachment pin P3.

Figure 17:
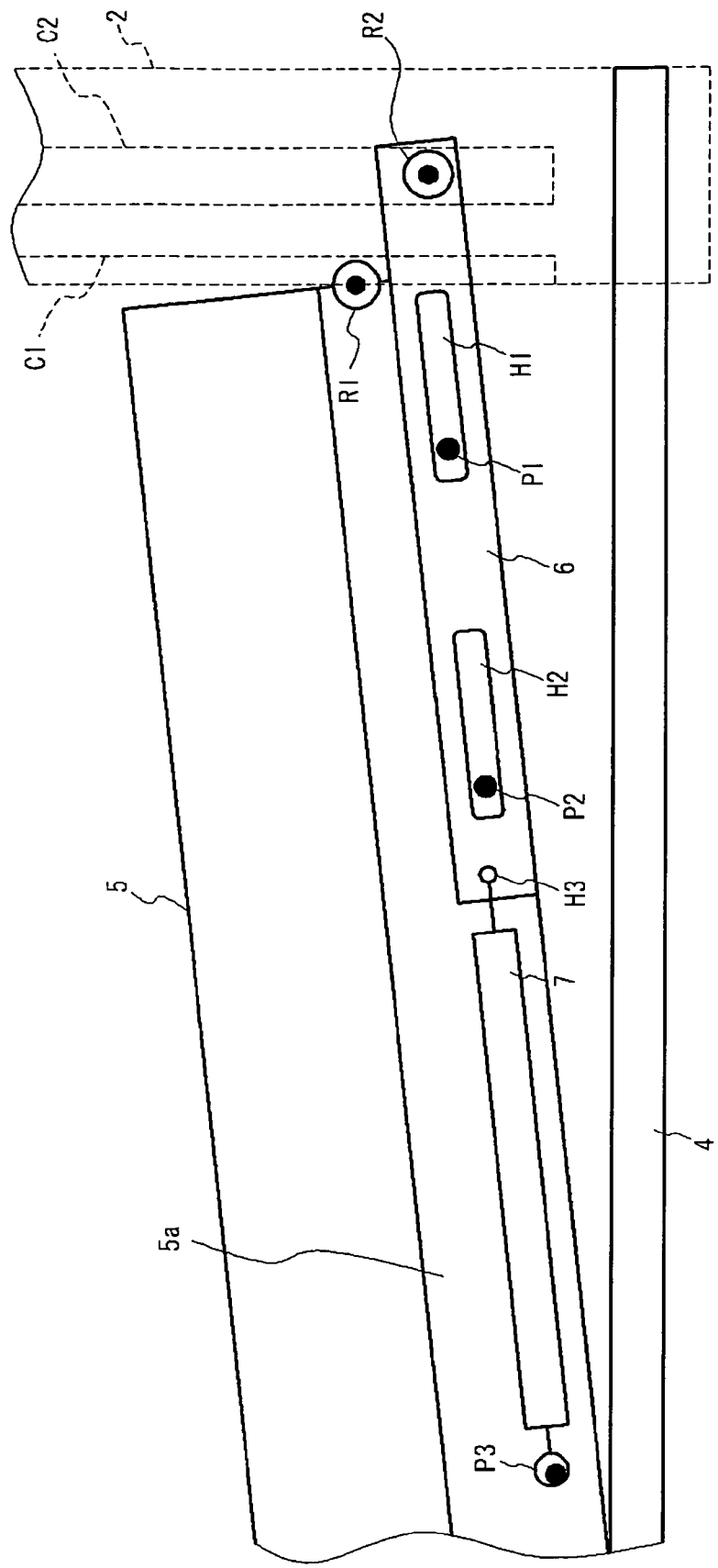
FIG. 17 is a view describing an operation of the in-vehicle display apparatus.

In the foregoing, the structure of the in-vehicle display apparatus having the panel tilting apparatus of the present embodiment is described with reference to the panel housed state shown in FIGS. 16A and 16B. Next, a description will now be given of an operation of the panel tilting apparatus of the present embodiment with reference to FIG. 17. FIG. 17 shows the structure of the panel tilting apparatus shown in FIG. 16B, and the same parts as those shown in FIG. 16B are given the same reference numerals.

The actuator rod 4 provided in the lower portion of the panel attachment frame 2 is driven by a motor provided within the apparatus in a direction indicated by an arrow in FIG. 17 in order to tilt the panel main body from the state in which the panel main body is housed, that is, from the upright state. The actuator rod 4 thus driven pushes the lower portion of the panel main body formed by the panel frame 5 and the housed panel main body 5a forwards. In this manner, the actuator rod 4 displaces one of the sides of the panel main body.

The engagement pins P1 and P2 fixed to the panel main body engage with the pin engagement long holes H1 and H2, respectively. Thus, when the lower portion of the panel main body is pushed forwards by driving the actuator rod 4, the engagement pins P1 and P2 pushes down the hold plate 6 in accordance with the inclined movement of the panel main body. At that time, the roller R2 attached to the hold plate 6 moves downwards while being restricted by the guide groove C2. Similarly, the engagement pins P1 and P2 become farther from the initial position in the guide groove C2 in association with the inclined movement of the panel main body. Thus, the engagement pins P1 and P2 are displaced from the respective positions shown in FIG. 16B in the longitudinal direction of the pin engagement long holes H1 and H2.

The spring 7 is further expanded as much as the displacement distance of the engagement pins P1 and P2 in the pin engagement long holes H1 and H2 from the positions shown in FIG. 16B (distance by which the panel frame 5 moves with respect to the hold plate 6), and pulls the panel main body and the hold plate 6. Thus, the roller R1 attached to the upper end of the housed panel main body 5a is pushed against the inner surface of the guide groove C1 by pulling force. Due to the function of the spring 7, it is possible to avoid play with the panel main body while sliding in the inclined state and stabilize the slide movement.

The state in which the inclined movement of the panel main body driven by the actuator rod 4 is finished is shown in FIG. 17. The inclined movement of the panel ends when the driving of the actuator rod 4 is stopped. The end point of the inclined movement of the panel main body in the fully open sate of the panel main body is an inclined position of the panel main body at a given remaining angle shown in FIG. 17.

As described above, by driving the actuator rod 4, the rollers R1 and R2 move along the guide grooves C1 and C2, respectively, and the engagement pins P1 and P2 slide in the pin engagement long holes H1 and H2, respectively.

The inclined angle of the panel main body can be adjusted by stopping driving the actuator rod 4 at an arbitrary timing.

The given angle defined when the inclined movement of the panel main body is stopped makes it easy to start rotating the roller R1 in the guide groove C1 by pulling back the actuator rod 4 in the reverse direction in order to return the panel main body to the upright state. When the panel main body is moved in the inclined state, the actuator rod 4 is driven forwards against the spring force of the spring 7. Thus, the spring force is retained even after the inclined movement of the panel main body is stopped.

When the panel main body is returned from the inclined state, the spring force retained is transmitted to the roller R1 in addition to the force generated at the time of pulling back the actuator rod 4. Thus, even when the panel main body is heavy, the spring force added makes it possible to smoothly return the panel main body to the upright position and utilize the driving force of the conventional actuator rod driving mechanism without any change.

Figure 18A:
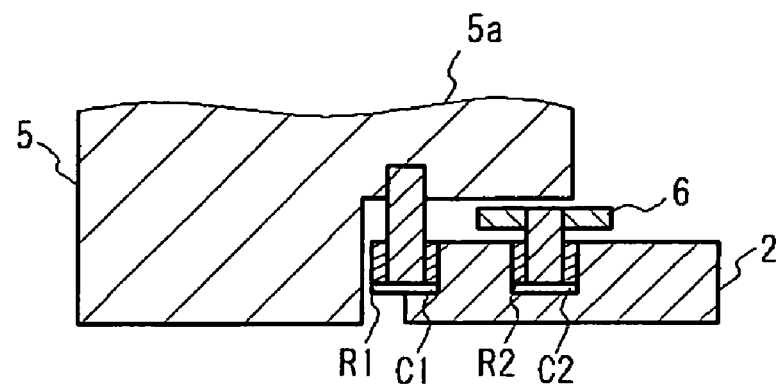
FIGS. 18A through 18C are views describing various variations of the embodiment of the in-vehicle display apparatus.
Figure 18B:
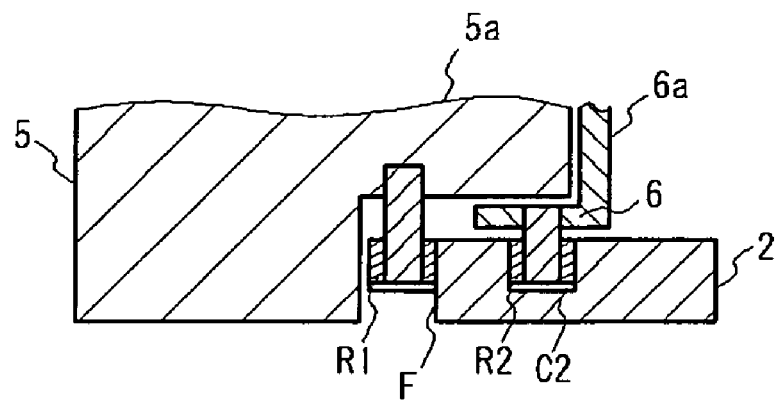
Figure 18C:
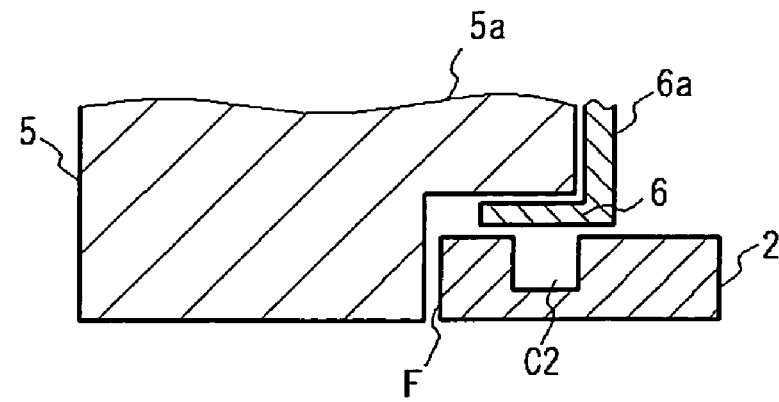

The description has been made of the structure and operation of the in-vehicle display apparatus equipped with the panel tilting apparatus of the present embodiment. Now, a description will be given, with reference to FIGS. 18A through 18C, of variations of the in-vehicle display apparatus with the panel tilting apparatus. FIGS. 18A and 18B are respectively cross-sectional views taken along the line X-X shown in FIG. 16B like FIG. 16A, and FIG. 18C is a cross-sectional view taken along the line Y-Y shown in FIG. 16B.

FIG. 18A shows a first variation of the in-vehicle display apparatus equipped with the panel tilting apparatus. In the aforementioned embodiment, as shown in FIG. 16A, the hold plates 6 arranged at both the opposite side walls of the housed panel main body 5a are integrated into a single piece by the support back plate 6a, so that the hold plates 6 have an identical movement. In the first variation, the support back plate 6a is omitted, and the hold plates 6 at both the opposite side walls can move independently. Even when the hold plates 6 are arranged separately, the objects of the present invention can be achieved sufficiently. The separate arrangement of the hold plates 6 is suitable for a case where there is a difficulty in the arrangement of the support back plate 6a because of the shape of the back surface of the housed panel main body 5a or arrangement of electric wiring.

FIG. 18B shows a second variation of the in-vehicle display apparatus having the panel tilting apparatus. In the aforementioned embodiment, as shown in FIG. 16A, the roller R1 is moved with rotary motion while being pressed against the side surface of the guide groove C1 formed on the inner surface of the panel attachment frame 2. In contrast, the second variation does not have the guide groove and uses the front surface F of the panel attachment frame 2 as the surface against which the roller R1 is pressed. When the front surface F has a smoothened surface within the range of rotary motion of the roller R1, similar advantages as those of the embodiment shown in FIG. 16A can be obtained.

For example, in the second embodiment shown in FIG. 18B, a gap is essentially defined between the panel frame 5 and the front surface F of the panel attachment frame 2 in order to move the roller R1 with rotary motion, wherein the gap has a size equal to at least the diameter of the roller R1. In order to minimize the gap, a third variation shown in FIG. 18C has an arrangement in which the back surface of the panel frame 5 facing the panel attachment frame 2 is made close to the front surface F of the panel attachment frame 2 except a portion in which the roller R1 is attached. A recess is formed in the panel frame 5 and accommodates the roller R1. The arrangement of the third embodiment is capable of preventing enter of dust when the panel main body is housed.

In the structure of the aforementioned embodiment, as shown in FIG. 18B, the upper surface of the panel frame 5 is flush with the upper surface of the housed panel main body 5a, and the step is defined between the panel frame 5 and the panel attachment frame 2 when the main body of the panel (housed panel main body 5a) is housed, as has been described previously. A fourth variation (not shown) directed to avoiding the step will now be described.

The step defined between the panel frame 5 and the panel attachment frame 2 at the time of housing the panel main body (housed panel main body 5a) results from the arrangement in which the housed panel main body 5a attached to the back of the panel frame 5 is arranged inside the panel attachment frame 2 and the upper end of the panel frame 5 is arranged so as to avoid the front surface of the panel attachment frame 2 when the panel main body (housed panel main body 5a) shifts to inclined movement from the housed state. With the above in mind, the fourth variation has an arrangement in which the side wall on the upper side of the panel attachment frame 2 is partially removed so as to match the shape of the panel attachment frame 51, so that a cutout portion can be formed in the side wall.

The upper end of the housed panel main body 5a engages with the cutout portion formed in the side wall on the upper side of the panel attachment frame 2 when the panel main body (housed panel main body is in the housed state).

When the upper surface of the panel frame 5 is flush with the upper surface of the housed panel main body 5a, there is no step related to the attached portion of the panel main body in the panel main body (housed panel main body 5a) is in the housed state, so that the entire upper surface of the apparatus can be flattened.

Next, a description will be given of improvements in the shape of the guide grooves in which the rollers of the in-vehicle display apparatus having the panel tilting apparatus of the present embodiment move with rotary motion. In the in-vehicle display apparatuses with the panel tilting apparatus of the present embodiment shown in FIGS. 15 through 17, the guide grooves C1 and C2 formed on the inner surfaces of the side walls of the panel attachment frame 2 extend straight along the longitudinal directions of the side walls. The roller R1 moves up and down in the guide groove C1 with rotary motion, and the roller R2 moves up and down in the guide groove C2 with rotary motion.

As described above, even in the case where the guide grooves are formed straight, the spring force retained is transmitted to the roller R1 in addition to the pulling back force when the actuator rod 4 is pulled back when the panel main body is returned from the inclined state. Thus, even if the panel main body is heavy, the additional spring force makes it possible to smoothly return the panel main body to the home position.

Figure 19:
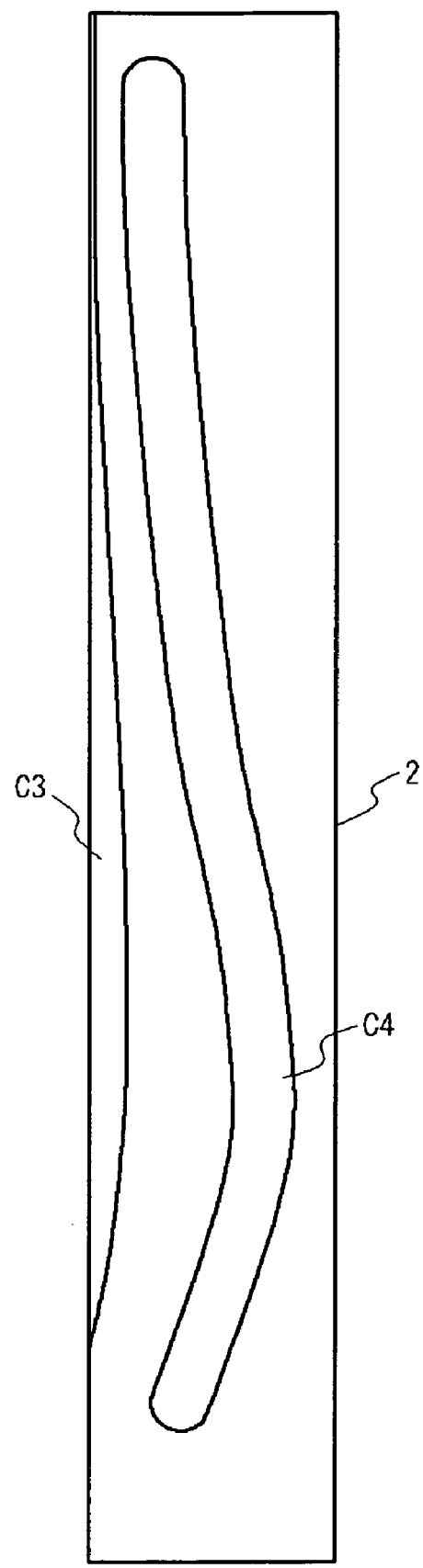
FIG. 19 is a view describing another variation of the embodiment of the in-vehicle display apparatus.
Figure 20A:
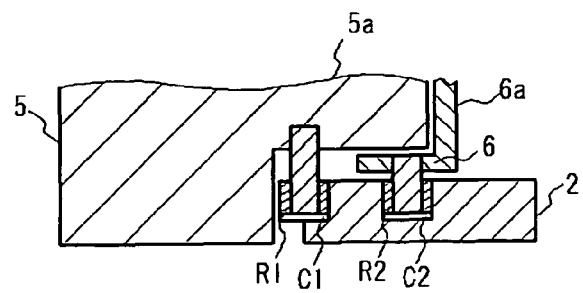
FIGS. 20A and 20B show a variation of the in-vehicle display apparatus in a state where the display panel stands upright.
Figure 20B:
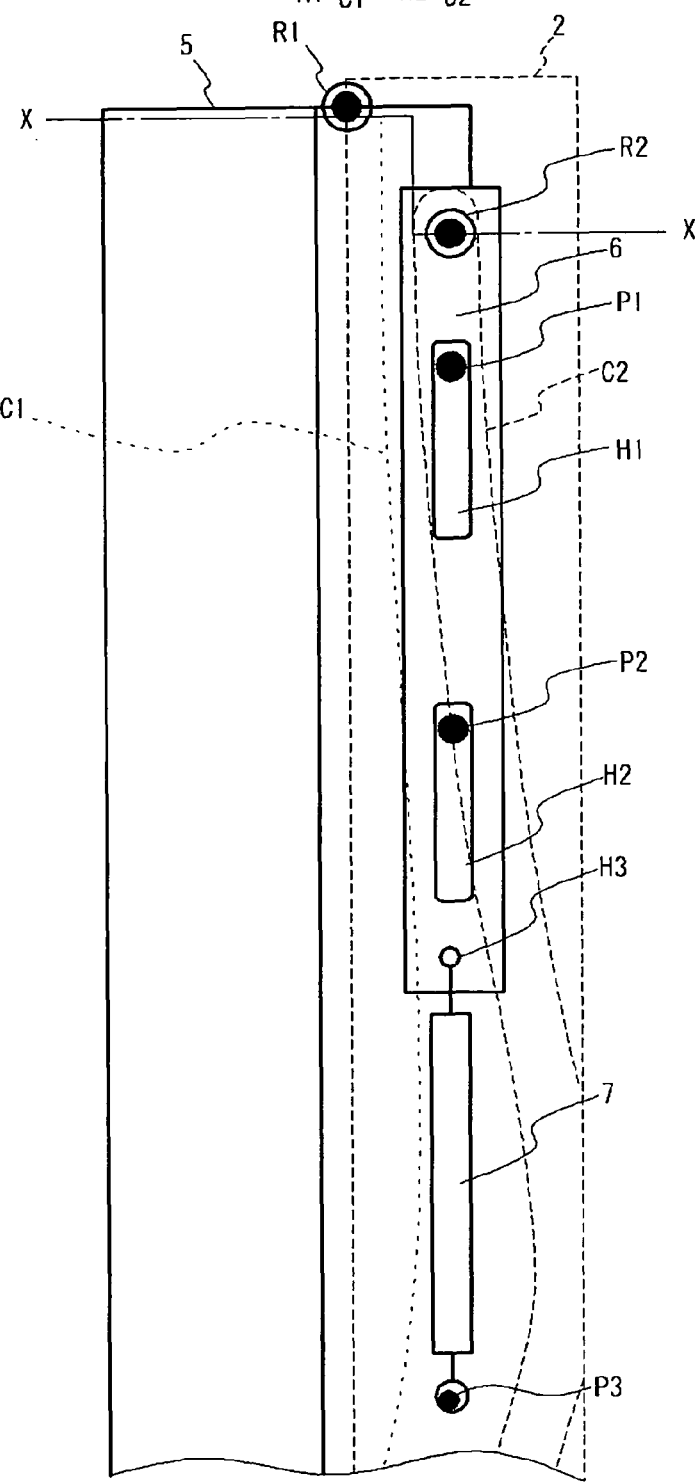
Figure 21:
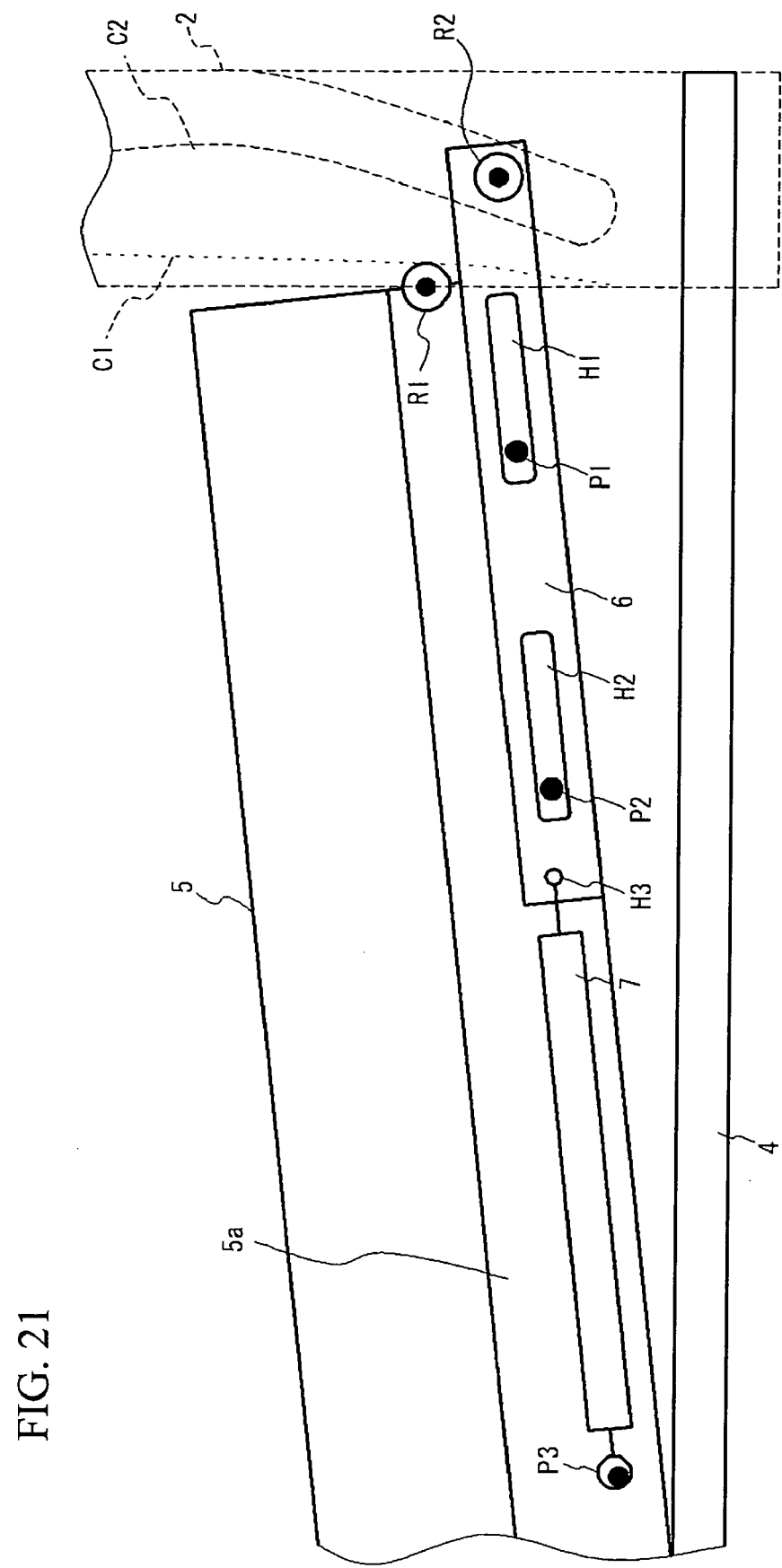
FIG. 21 is a view showing completion of inclined movement of the panel main body of the in-vehicle display apparatus in accordance with the variation.

A description will now be given, with reference to FIGS. 19 through 21, of a fifth embodiment of the in-vehicle display apparatus having the panel tilting apparatus capable of more smoothly returning the panel main body to the home position with inclined movement. FIG. 19 shows only an inner surface of a side wall of the panel attachment frame 2. FIGS. 20A and 20B show the in-vehicle display apparatus of the fifth variation with the display panel standing upright. FIG. 20A is a cross-sectional view of the upper portion of the in-vehicle display apparatus of the fifth variation taken along the line X-X shown in FIG. 20B, and FIG. 20B is a side view that mainly shows the structure of the in-vehicle display apparatus of the fifth variation related to the panel frame 5. FIG. 21 shows a state in which inclined movement of the panel main body by driving the actuator rod 4 is finished.

As shown in FIG. 19, the guide groove formed on the inner surface has a slightly curved shape in a lower portion thereof. The guide groove C3 corresponds to the guide groove C1, and the roller R1 moves in the guide groove C3 with rotary motion. The guide groove C4 corresponds to the guide groove C2, and the roller R2 moves in the guide groove C4 with rotary motion.

The guide grooves must be formed so that the panel frame 5 does not hit the front surface of the panel attachment frame 2 when the panel main body moves in the inclined state. Thus, the guide groove C3 is slightly curved. The degree of curvature of the guide groove C4 may be adjusted within the width of the side wall of the panel attachment frame 2 as long as the engagement pins P1 and P2 can move along the pin engagement long holes H1 and H2 formed in the hold plates.

As shown in FIG. 19, the lower portions of the guide grooves C3 and C4 are curved. Thus, when the returning of the panel main body is started, the rollers R1 and R2 obliquely hit the inner surfaces of the guide grooves C3 and C4, as compared to the case where the guide grooves are straight, so that the rollers R1 and R2 can start to move with rotary motion more easily.

A description will be given, with reference to FIGS. 22 through 26, of a mechanism for restraining play between the hold plates and the panel main body (display panel). It is to be noted that a description unnecessary for the mechanism for restraining play is omitted in the following.

Figure 22:
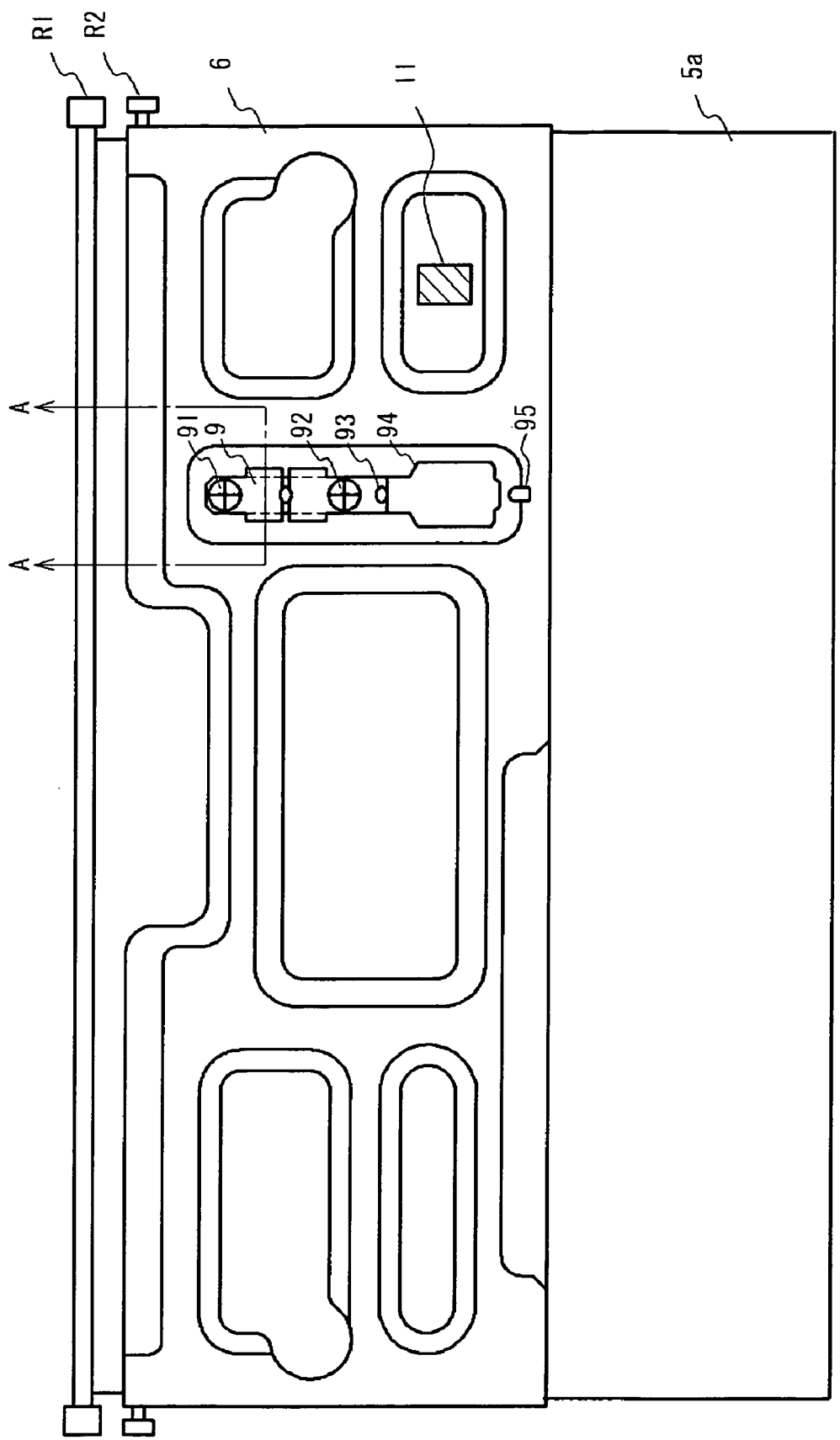
FIG. 22 is a back view showing the panel main body and a hold plate.

FIG. 22 is a back view of the housed panel main body 5a and the hold plate 6. The hold plate 6 is at a position where the panel main body stands upright with respect to the housed panel main body 5a. The mechanism for restraining play is fixed to the back surface of the housed panel main body 5a, and is equipped with a play restraining member 9, which is inserted into and engaged with a guide groove 94 (fourth guide portion) that allows movement of the panel frame 5 with respect to the hold plate 6.

A buffer member 11 is provided to the back surface of the housed panel main body 5a.

The play restraining member 9 is fixed to the back surface of the panel main body by screws 91 and 92. The guide groove 94 into which the play restraining member 9 is inserted is formed in the hold plate 6. The hold plate 6 moves along the guide groove 94 into which the play restraining member 9 is inserted. It is thus possible to prevent play in the moving direction of the hold plate 6 with respect to the housed panel main body 5a and smoothly move the display panel to the hold plate. The display panel can be tilted smoothly.

The play restraining member 9 may be made of resin, and the hold plate may be made of a metal. It is thus possible to restrain friction between the play restraining member 9 and the hold plate 6 and facilitate smooth movement of the panel frame 5 with respect to the hold plate 6. The play restraining member 9 may be made of polyacetal resin or another resin.

Figure 23:
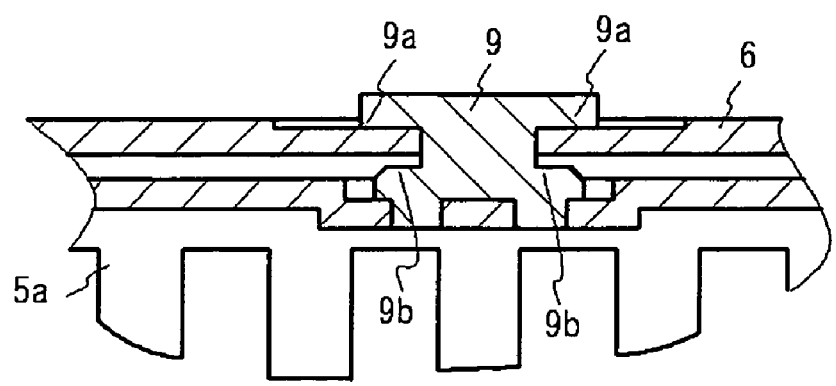
FIG. 23 is a cross-sectional view taken along a line A-A shown in FIG. 22.

FIG. 23 is a cross-sectional view taken along a line A-A shown in FIG. 22. The play restraining member 9 is formed so as to limit the distance between the back surface of the housed panel main body 5a and the hold plate 6. More particularly, as shown in FIG. 23, the play restraining member 9 is formed so that the hold plate 6 is sandwiched between protrusions 9a and 9b. With this structure, it is possible to prevent the back surface of the housed panel main body 55a and the hold plate 6 from contacting each other and to smoothly move the panel frame 5 with respect to the hold plate 6. Particularly, when the in-vehicle display apparatus of the present invention is applied to a navigation apparatus using a display panel on which different videos can be displayed in right and left halves on the screen, the present invention is capable of smoothly moving the heavy housed panel main body 5a with respect to the hold plate 6.

Figure 24:
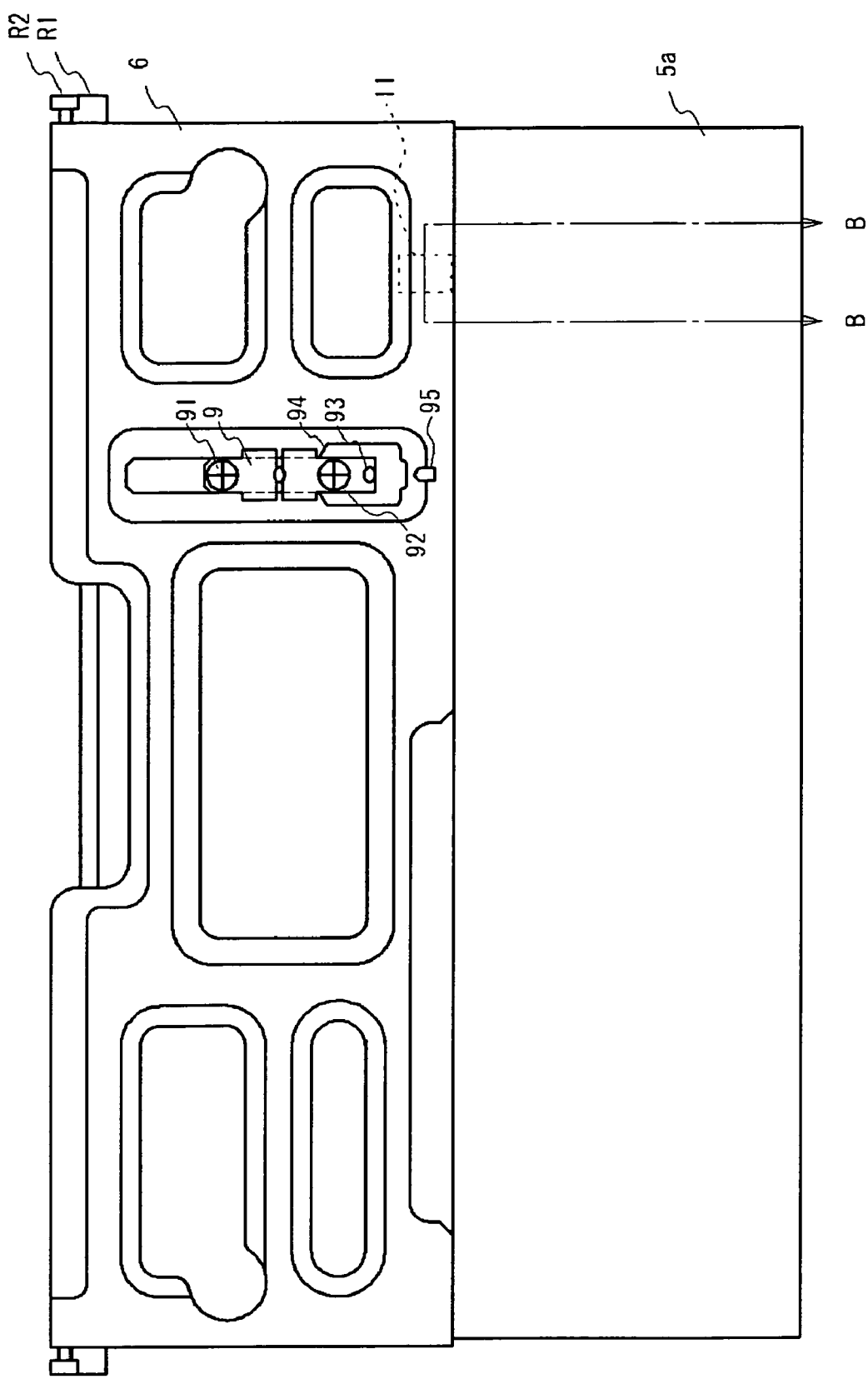
FIG. 24 is a view describing a buffer member.
Figure 25:
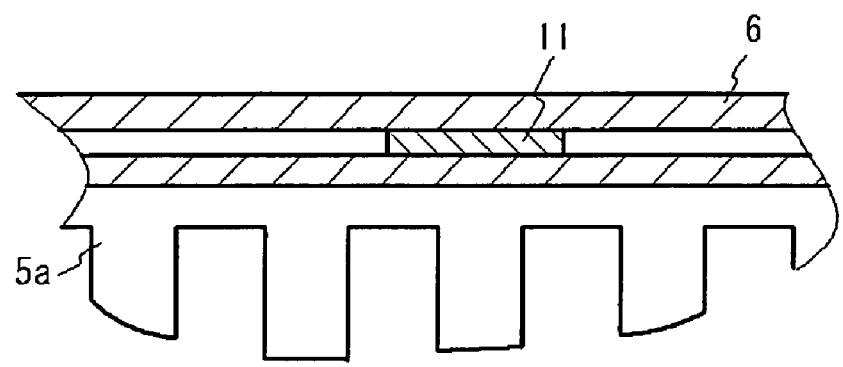
FIG. 25 is a cross-sectional view taken along a line B-B shown in FIG. 24.

FIG. 24 is a view for describing the buffer member 11. The buffer member 11 is provided to the back surface of the housed panel main body 5a. When the hold plate 6 is moved upwards from the state shown in FIG. 22, as shown in FIG. 24, the hold plate 6 moves so as to cover the buffer member 11, which is hidden by the hold plate 6. FIG. 25 is a cross-sectional view taken along a line B-B shown in FIG. 24. As shown in FIG. 25, the buffer member 11 contacts the surface of the hold plate 6 that faces the housed panel main body 5a. Thus, the buffer member 11 buffers the movement of the panel frame 5 with respect to the hold plate 6, and buffers the contact of the back surface of the housed panel main body 5a and the hold plate 6. It is thus possible to restrain play between the hold plate 6 and the panel frame 5 and more smoothly move the panel frame 5 with respect to the hold plate 6. FIG. 24 shows the position of the hold plate 6 with respect to the housed panel main body 5a at the completion of the inclined movement of the panel in which the front surface of the apparatus main body 1 is exposed.

The buffer member 11 may be formed by sponge. However, the buffer member 11 is not limited to sponge but may be made of a material capable of buffering the movement of the panel frame 5 with respect to the hold plate 6 and buffering the contact of the back surface of the housed panel main body 5a and the hold plate 6. The buffer member is desirably formed of a material that has a good slidability to the hold plate 6 made of a metal.

Figure 26:
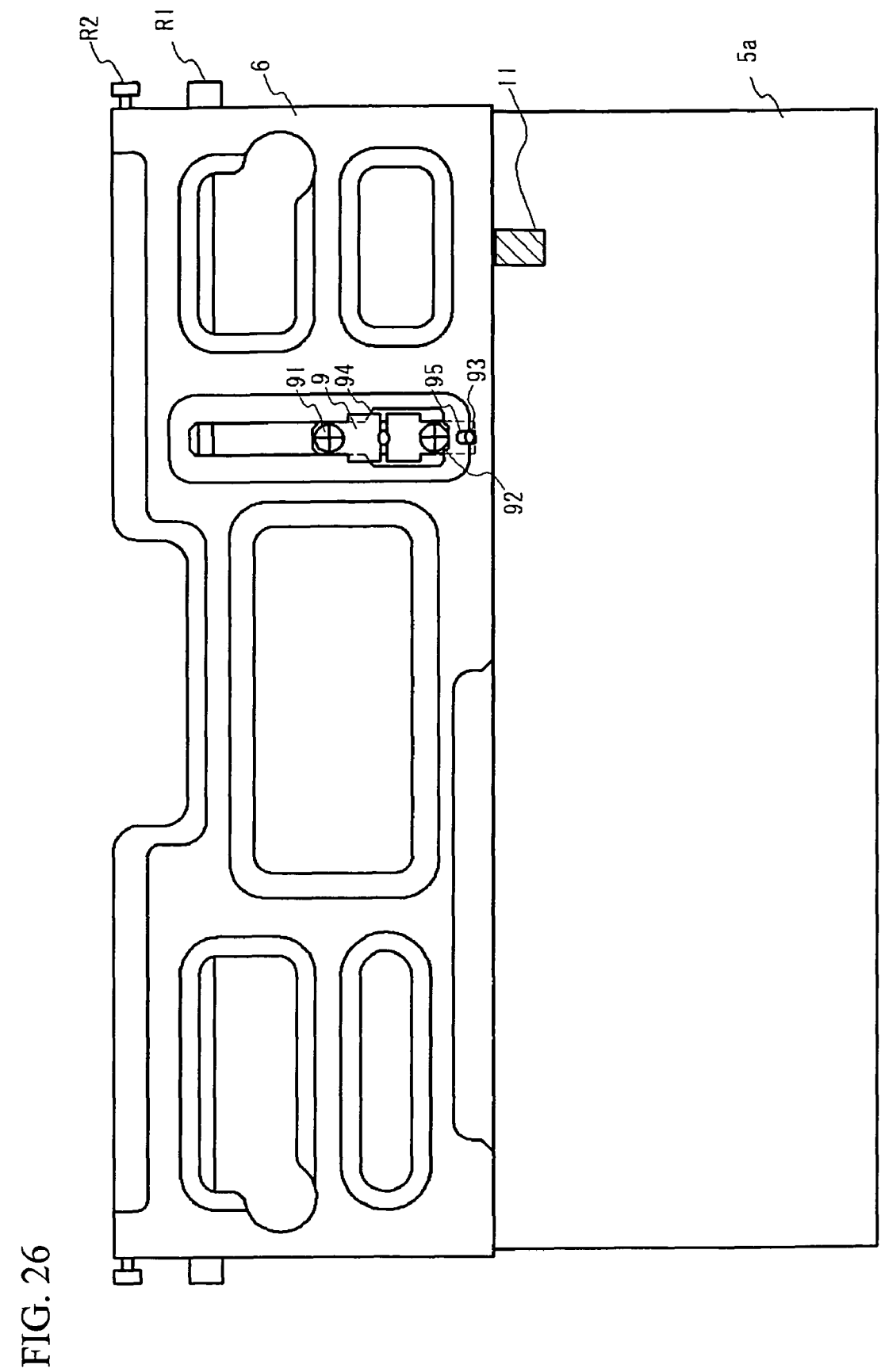
FIG. 26 is a view describing an engagement stopper.

FIG. 26 shows a latch formed in the play restraining member, in which the hold plate 6 is moved upwards from the position shown in FIG. 25. A latch protrusion 93 is provided to the play restraining member 9 at a position where the latch protrusion 93 engages with the hold plate 6 and does not interfere with attachment work of the display portion 100. The latch protrusion 93 is inserted into a latch hole 95 formed in the hold plate 6. The panel frame 5 can be manufactured easily by latching the hold plate 6 to the panel frame 5 at the position where the hold plate 6 does not prevent the process for manufacturing the display portion 100. It is thus possible to restrain play and latch the hold plate 6 by the single member. More specifically, when the hold plate 6 is latched to the panel frame 5 at the given position, the most back surface of the panel frame 5 is exposed, so that components can be easily incorporated into the panel frame 5 and the display portion 100 can be assembled easily.

In the in-vehicle display apparatus in the present embodiment, the latch hole 95 is formed in the hold plate 6 and the latch protrusion 93 that is inserted into the latch hole 95 is formed to the play restraining member 9. However, the present embodiment is not limited to the above. For example, the latch may be formed on the surface of the hold plate 6 that faces the panel frame 5, and the latch hole into which the latch protrusion is inserted may be formed in the panel frame 5.

The aforementioned embodiment is an exemplary in-vehicle display apparatus allowing first and second images on the display screen of the common display panel to be viewed in different directions. The display panel of this type is heavier and thicker than the normal display panel. The present invention applied to the above in-vehicle display apparatus is capable of smoothly moving the heavy and thick display panel in the inclined state.

The above-mentioned embodiment is an exemplary case where the in-vehicle display apparatus with the panel tilting apparatus of the present invention is applied to the display panel incorporated into the navigation apparatus. However, the in-vehicle display apparatus with the panel tilting apparatus of the present invention is not limited to the inclined movement of the display panel but may be applied to inclined movement of a panel provided in an electronic apparatus (for example, an operation panel that does not have a display panel).

The above-mentioned embodiment is an exemplary preferred embodiment. The present invention is not limited to the above embodiment but various variations may be made without departing from the present invention.

The invention claimed is:

1. An electronic apparatus comprising:
   an electronic apparatus main body;
   a panel main body that has a first guided portion guided by a first guide portion formed in the electronic apparatus main body, and moves in an inclined state with respect to the electronic apparatus main body;
   a hold member that has a second guided portion guided by a second guide portion formed in the electronic apparatus main body,
   the hold member slidably holds the panel main body with respect to the hold member;
   an actuator part that displaces a vicinity of an end of a side of the panel main body; and
   an engagement portion that is provided to the panel main body and slides along a third guide portion provided in the hold member, wherein:
   the first guided portion is formed in vicinity of another end of the side of the panel main body:
   the second guided portion is formed close to an end of the hold member;
   the electronic apparatus main body has an attachment frame;
   the first and second guide portions are respectively first and second slide surfaces formed on an inner surface of the attachment frame facing the side of the panel main body; and
   the first and second guided portions slide along the first and second slide surfaces, respectively, and the engagement portion slides in the third guide portion by driving the actuator part.

2. The electronic apparatus as claimed in claim 1, wherein the first and second guide portions have respective rollers.

3. The electronic apparatus as claimed in claim 1, wherein a side of the second guide portion has a lower portion that is curved in one of directions in which the actuator part operates.

4. The electronic apparatus as claimed in claim 1, wherein the second guide portion is a groove.

5. The electronic apparatus as claimed in claim 1, wherein the first guide portion is provided on a front surface of the attachment frame.

6. The electronic apparatus as claimed in claim 1, wherein the panel main body is equipped with a display panel.

7. The electronic apparatus as claimed in claim 6, wherein the display panel displays individual images on a single screen respectively viewed only in specific directions.

8. An electronic apparatus comprising:
   an electronic apparatus main body;
   a panel main body that has a first guided portion guided by a first guide portion formed in the electronic apparatus main body, and moves in an inclined state with respect to the electronic apparatus main body;
   a hold member that has a second guided portion guided by a second guide portion formed in the electronic apparatus main body, the hold member slidably holds the panel main body with respect to the hold member;
   a first attachment portion provided close to an end of a side of the panel main body;
   a second attachment portion provided to close to an end of a side of the hold member; and
   an urging member that has ends respectively attached to the first and second attachment portions and urges the hold member towards the first attachment portion.

9. An electronic apparatus comprising:
   an electronic apparatus main body;
   a panel main body that has a first guided portion guided by a first guide portion formed in the electronic apparatus main body, and moves in an inclined state with respect to the electronic apparatus main body; and
   a hold member that has a second guided portion guided by a second guide portion formed in the electronic apparatus main body, the hold member slidably holds the panel main body with respect to the hold member,
   wherein the hold member comprises hold plates respectively arranged at both sides of the panel main body, and a back plate that is arranged on a back surface of the panel main body and connects the hold plates.

10. An electronic apparatus comprising:
    an electronic apparatus main body;
    a panel main body that has a first guided portion guided by a first guide portion formed in the electronic apparatus main body, and moves in an inclined state with respect to the electronic apparatus main body;
    a hold member that has a second guided portion guided by a second guide portion formed in the electronic apparatus main body, the hold member slidably holds the panel main body with respect to the hold member; and
    a play restraining portion that restrains play between the hold member and the panel main body,
    wherein the play restraining portion includes a play restraining member, and the play restraining member is fixed to the panel main body and movably holds the hold member.

11. An electronic apparatus comprising:
    an electronic apparatus main body;
    a panel main body that has a first guided portion guided by a first guide portion formed in the electronic apparatus main body, and moves in an inclined state with respect to the electronic apparatus main body;
    a hold member that has a second guided portion guided by a second guide portion formed in the electronic apparatus main body; and
    a play restraining portion, wherein:

the hold member slidably holds the panel main body with respect to the hold member; and the play restraining portion comprises a fourth guide portion provided in the hold member, and a play restraining member that engages with the fourth guide portion and allows movement of the panel main body with respect to the hold member.

12. An electronic apparatus comprising:

an electronic apparatus main body;

a panel main body that has a first guided portion guided by a first guide portion formed in the electronic apparatus main body, and moves in an inclined state with respect to the electronic apparatus main body;

a hold member that has a second guided portion guided by a second guide portion formed in the electronic apparatus main body; and a play restraining portion, wherein:

the hold member slidably holds the panel main body with respect to the hold member; and the play restraining portion restrains the distance between a back surface of the panel main body and the hold member.

13. An electronic apparatus comprising:

an electronic apparatus main body;

a panel main body that has a first guided portion guided by a first guide portion formed in the electronic apparatus main body, and moves in an inclined state with respect to the electronic apparatus main body;

a hold member that has a second guided portion guided by a second guide portion formed in the electronic apparatus main body; and a play restraining portion, wherein:

the hold member slidably holds the panel main body with respect to the hold member; and the play restraining portion comprises a buffer member that is arranged between a back surface of the panel main body and the hold member and buffers contact between the back surface of the panel main body and the hold member.

* * * * *